(12) United States Patent
Nakamura et al.

(10) Patent No.: US 11,008,732 B2
(45) Date of Patent: May 18, 2021

(54) WORK ASSIST SYSTEM FOR WORK MACHINE

(71) Applicant: HITACHI CONSTRUCTION MACHINERY CO., LTD., Tokyo (JP)

(72) Inventors: Satoshi Nakamura, Tokyo (JP); Akinori Ishii, Tsuchiura (JP); Kunitsugu Tomita, Tsuchiura (JP); Takahiro Inada, Tokyo (JP); Saku Egawa, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 108 days.

(21) Appl. No.: 15/737,859

(22) PCT Filed: Jun. 27, 2016

(86) PCT No.: PCT/JP2016/068975
§ 371 (c)(1),
(2) Date: Dec. 19, 2017

(87) PCT Pub. No.: WO2017/002749
PCT Pub. Date: Jan. 5, 2017

(65) Prior Publication Data
US 2019/0003152 A1   Jan. 3, 2019

(30) Foreign Application Priority Data

Jun. 29, 2015   (JP) .............................. JP2015-129815

(51) Int. Cl.
*E02F 9/20*   (2006.01)
*E02F 9/26*   (2006.01)

(52) U.S. Cl.
CPC .............. *E02F 9/20* (2013.01); *E02F 9/2029* (2013.01); *E02F 9/26* (2013.01); *E02F 9/261* (2013.01); *E02F 9/264* (2013.01); *B60K 2370/52* (2019.05)

(58) Field of Classification Search
CPC ... E02F 9/20; E02F 9/2029; E02F 9/26; E02F 9/261; E02F 9/264; E02F 9/2041;
(Continued)

(56) References Cited

U.S. PATENT DOCUMENTS 6,076,029 A * 6/2000 Watanabe ............... E02F 3/437
701/50
6,108,949 A * 8/2000 Singh ...................... E02F 3/437
37/195
(Continued)

FOREIGN PATENT DOCUMENTS

JP     10-212740 A     8/1998
JP   2000-291076 A    10/2000
(Continued)

OTHER PUBLICATIONS

Extended European Search Report received in corresponding European Application No. 16817857.2 dated Jan. 7, 2019.
(Continued)

*Primary Examiner* — Abby Y Lin
*Assistant Examiner* — Renee LaRose
(74) *Attorney, Agent, or Firm* — Mattingly & Malur, PC

(57) ABSTRACT

A work assist system for a self-propelled hydraulic excavator includes a controller (18) configured to determine a region in which an assumed excavation amount is obtained from an object to be excavated by one excavation operation of the hydraulic excavator (1) as a region to be excavated S on the basis of the assumed excavation amount in the one excavation operation of the hydraulic excavator (1), and to
(Continued)

calculate a work position Pw of the hydraulic excavator (1) at which the hydraulic excavator (1) performs a next excavation operation on the basis of the region to be excavated S. A distance Lw from the hydraulic excavator to the work position Pw is calculated by the controller (18) and this distance Lw is displayed on the monitor (21).

4 Claims, 21 Drawing Sheets

(58) Field of Classification Search
CPC ..... E02F 5/02; E02F 5/025; E02F 3/04; E02F 3/141; E02F 9/2033; E02F 3/28; E02F 9/2221; E02F 9/2242
See application file for complete search history.

(56) References Cited

U.S. PATENT DOCUMENTS

| | | | |
|---|---|---|---|
| 2013/0006484 A1* | 1/2013 | Avitzur | E02F 9/205 |
| | | | 701/50 |
| 2013/0034419 A1 | 2/2013 | Tsukane | |
| 2013/0158785 A1 | 6/2013 | Fukano et al. | |
| 2014/0107895 A1 | 4/2014 | Faivre et al. | |
| 2014/0200776 A1* | 7/2014 | Matsuyama | E02F 3/435 |
| | | | 701/50 |
| 2016/0076228 A1* | 3/2016 | Nau | E02F 9/261 |
| | | | 701/50 |

FOREIGN PATENT DOCUMENTS

| | | |
|---|---|---|
| JP | 2005-68764 A | 3/2005 |
| JP | 2011-43002 A | 3/2011 |
| JP | 2012-172428 A | 9/2012 |
| JP | 5202667 B2 | 6/2013 |

OTHER PUBLICATIONS

International Search Report of PCT/JP2016/068975 dated Aug. 2, 2016.
Canadian Office Action received in corresponding Canadian Application No. 2,989,984 dated Oct. 9, 2018.
International Preliminary Report on Patentability received in corresponding International Application No. PCT/JP2016/068975 dated Jan. 11, 2018.

* cited by examiner

WORK ASSIST SYSTEM FOR WORK MACHINE

TECHNICAL FIELD

The present invention relates to a work assist system for a work machine for assisting locating of a work position of a self-propelled work machine.

BACKGROUND ART

There is known a system for assisting work of a self-propelled work machine such as a hydraulic excavator by providing a position relationship between the work machine and an object to be excavated. As a system of this type, Japanese Patent No. 5202667 (Patent Document 1), for example, discloses a hydraulic excavator position guidance system for displaying a position of a hydraulic excavator at which an overlap area between a target work surface and a workable range, i.e., a range which can be reached by a work tool of the hydraulic excavator becomes a maximum area as an optimum work position on the basis of the workable range and a shape of the target work surface.

PRIOR ART DOCUMENT

Patent Document

Patent Document 1: Japanese Patent No. 5202667

SUMMARY OF THE INVENTION

Problem to be Solved by the Invention

Meanwhile, in excavation work by a hydraulic excavator, often carried out is rough excavation that repeats an excavation operation in which the hydraulic excavator is placed on an object to be excavated and a work device (work arm) extends from an end portion of an upper surface of the object to be excavated to a height lower than a height of a travel structure of the excavator, and a retreat operation of the excavator after the excavation operation. In this case, a height (bench height) of the object to be excavated on which the excavator is placed sometimes changes depending on a location, a situation, a work progress, and the like. When it is desired to maintain work efficiency by keeping an excavation amount in one excavation operation despite a difference in the height of the object to be excavated and the object to be excavated is lower in height, the excavator needs to excavate the object to be excavated at a position at which the excavator is located farther from the end portion of the upper surface of the object to be excavated. In this way, as the height of the object to be excavated is lower, the optimum excavation position becomes farther from the end portion of the upper surface of the object to be excavated. In many cases, however, it is difficult for an operator on the excavator to visually know the height of the object to be excavated, or the operator can visually recognize the height but cannot accurately grasp the height. It is, therefore, difficult to continue excavation while stopping the excavator at the optimum excavation position in response to a change in the height of the object to be excavated.

Excavation based on a bench cut method (step-by-step mining method) in a strip mine corresponds to a concrete example of the work carried out in the above situation. An object to be excavated in this case is called bench formed into a stepped shape with one or more steps.

In relation to this problem, according to the hydraulic excavator position guidance system of Japanese Patent No. 5202667, the position of the hydraulic excavator at which the overlap area between the target work surface and the workable range (work tool movable range) becomes maximum is set as the optimum work position. Owing to this, in a situation in which excavation based on the bench cut method is carried out as described above, it is difficult to calculate a position suited for keeping the excavation amount in each excavation operation.

An object of the present invention is to provide a work assist system for a work machine capable of guiding the work machine to a position suited for keeping a work amount even when the work machine carries out work while being placed on an object to be excavated and a height of the object to be excavated changes.

Means for Solving the Problems

To solve such problems, a work assist system for a work machine according to the present invention is a work assist system for a self-propelled work machine, including: a controller configured to, on the basis of the assumed excavation amount in the one excavation operation of the work machine, determine a region in which an assumed excavation amount is obtained from an object to be excavated by one excavation operation of the work machine as a region to be excavated, and on the basis of the region to be excavated, calculate a work position of the work machine at which the work machine performs a next excavation operation; and a display device that displays information related to the work position.

Effect of the Invention

According to the present invention, a stop position is calculated in accordance with a height of an object to be excavated so as to keep an excavation amount, and it is, therefore, possible to easily guide a work machine to the stop position and to maintain work efficiency high.

MODES FOR CARRYING OUT THE INVENTION

Embodiments of the present invention will be described hereinafter with reference to the drawings.

First Embodiment

Configurations of a work machine and a work assist system equipped in the work machine will be described using FIGS. 1 and 2.

Figure 1:
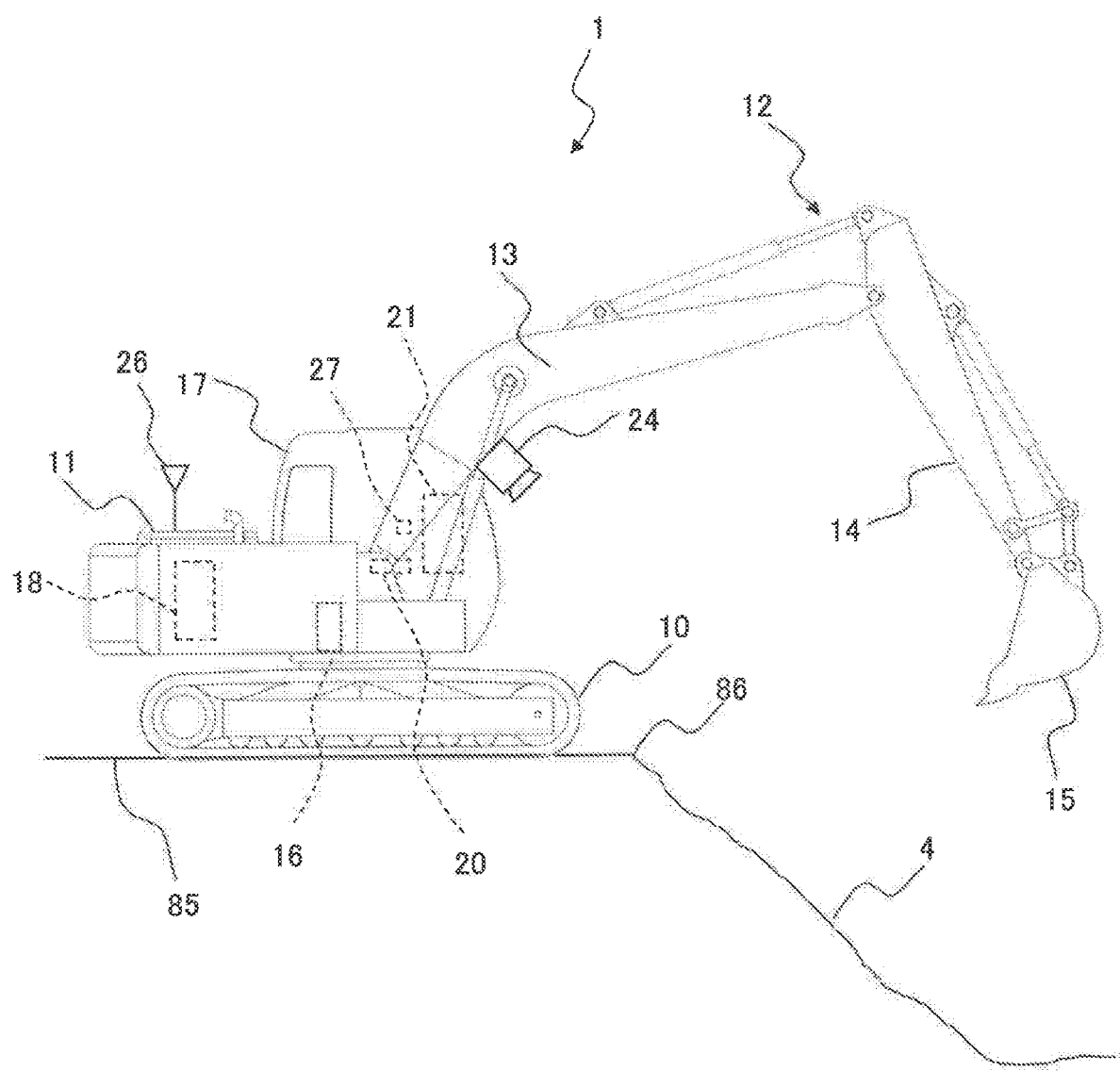
FIG. 1 is an outside drawing showing an example of a configuration of a hydraulic excavator to which the present invention is applied.

FIG. 1 is an outside drawing of a hydraulic excavator that is an example of a self-propelled work machine. A hydraulic excavator 1 is configured with a lower travel structure 10, an upper swing structure 11 swingably provided on the lower travel structure 10, a boom 13 rotatably provided in front of the upper swing structure 11, an arm 14 rotatably provided on a tip end of the boom 13, a bucket 15 rotatably provided on a tip end of the arm 14, a multijoint type front work device (work device) 12 configured by the boom 13, the arm 14, and the bucket 15, an operation room 17 in which an operator gets on board and operates the excavator 1, operation lever (operation device) 19 (refer to FIG. 9) provided within the operation room 17 and used for operating the hydraulic excavator 1, and a controller 18 exercising control over an operation of the hydraulic excavator 1 on the basis of an output (a hydraulic signal or an electrical signal) from the operation lever 19.

The present embodiment is implemented on the assumption of excavation based on a bench cut method, and an object to be excavated by the hydraulic excavator 1 is a bench formed into a stepped shape. The bench includes a bench upper surface (floor) 85 that is a flat surface on which the hydraulic excavator 1 is placed at a time of excavation work, and a surface to be excavated 4 that is a downward inclined surface (bench side surface) connected to the bench upper surface 85. In the bench of FIG. 1, an edge 86 appears in a boundary portion between the bench upper surface 85 and the surface to be excavated 4. At the time of the excavation work, the hydraulic excavator 1 is placed on the bench upper surface 85 in such a manner that the edge 86 is located in front of the excavator, and excavates the surface to be excavated 4 while appropriately expanding or contracting the front work device 12 from the position.

A laser distance meter 24 that is a distance sensor which measures a distance to a surrounding object and that is a shape sensor for mainly detecting a surface shape of the object to be excavated (bench) is fixed to a front of the operation room 17 at a predetermined angle (laser distance meter mounting angle) ad (refer to FIG. 11) with respect to the excavator ground contact surface 85. A monitor 21, a setting input device 20, and a work position display switch 27 (all of which will be described later) are equipped in the operation room 17. Furthermore, the upper swing structure 11 is equipped with a wireless device 26 that is a communication device for holding communication with an external device or an external computer, and a controller (control system) 18 that is a computer (for example, a microcomputer) configured to execute various information processes related to the hydraulic excavator 1.

Figure 2:
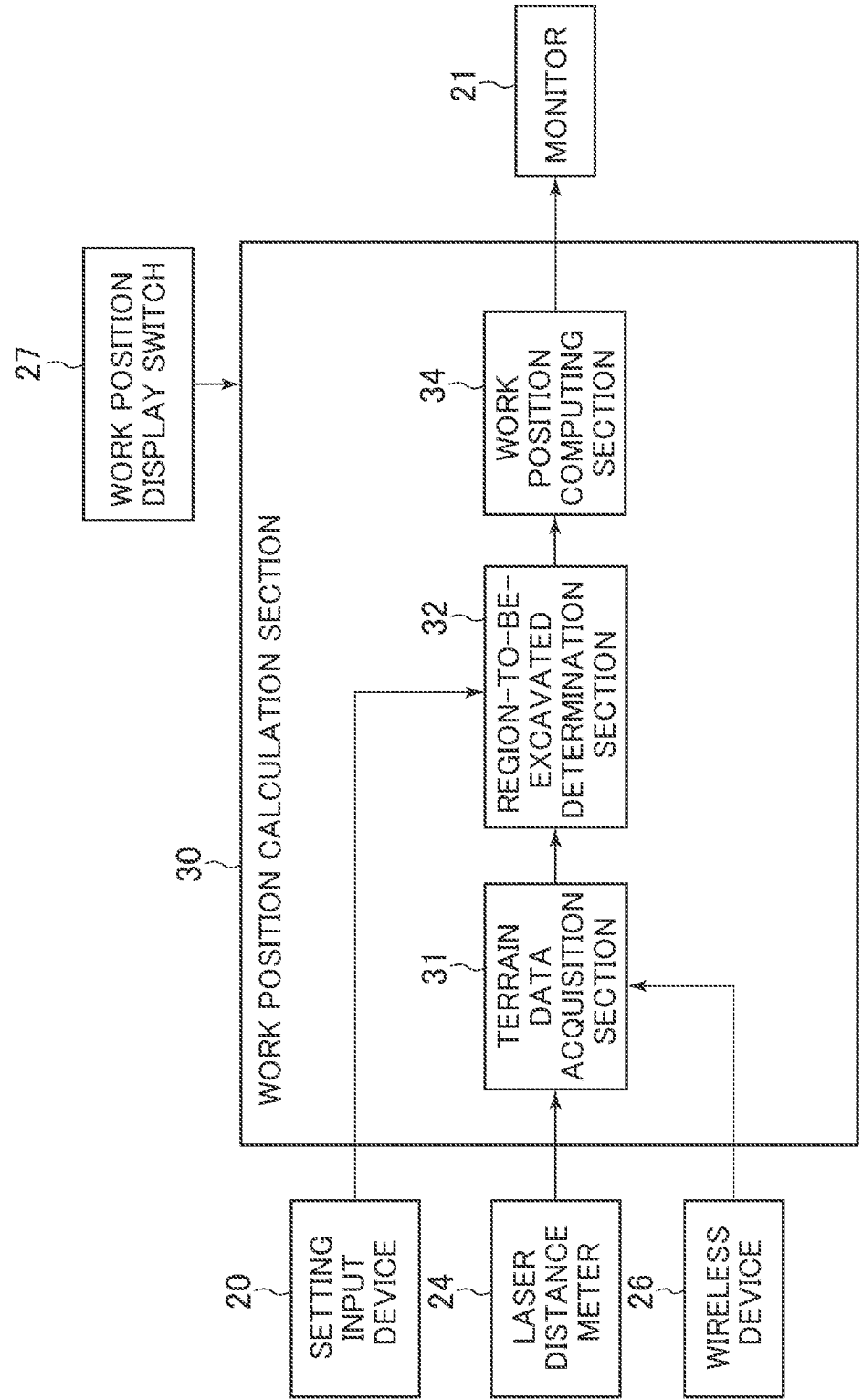
FIG. 2 is a schematic diagram showing a system configuration of a work assist system according to a first embodiment of the present invention.

FIG. 2 is a schematic diagram showing a system configuration of a work assist system for a work machine mounted in the hydraulic excavator 1 and displaying a work position. Same sections as those in the preceding drawing are denoted by the same reference characters and description thereof is often omitted (the same thing is true for subsequent drawings).

The work assist system includes the setting input device 20 that is an input device (a keyboard, a mouse, a plurality of buttons, a touch panel, and the like) for changing various types of setting of the work assist system; a work position calculation section 30 that is configured as a program within the controller 18 and that calculates a stop position (often referred to as "work position") of the hydraulic excavator 1 for a next excavation operation; the monitor (display device) 21 that displays a work position Pw (refer to FIG. 6 to be described later) or information related to the work position Pw (for example, a horizontal distance Lw (refer to FIG. 6) from a tip end Cf (refer to FIG. 6) of the lower travel structure 10 to the work position Pw, and the like); and the work position display switch 27 that alternatively instructs a changeover between ON and OFF of the work position being displayed on the monitor 21 (or may alternatively between ON and OFF of work position calculation by the work position calculation section 30).

Figure 3:
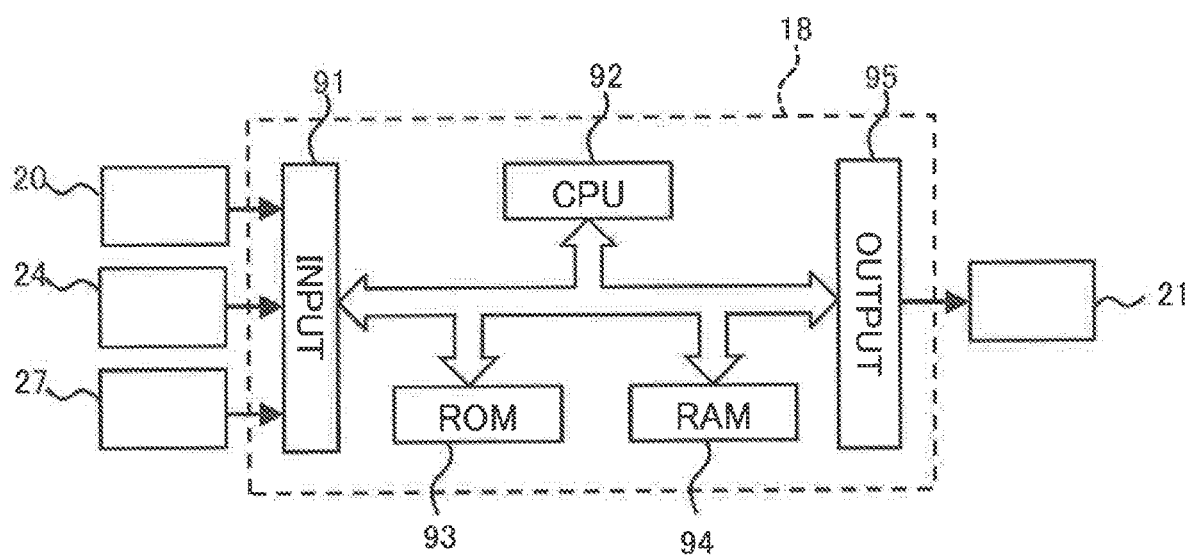
FIG. 3 is a hardware configuration diagram of a controller 18.

FIG. 3 shows a hardware configuration of the controller 18. The controller 18 has an input section 91, a central processing unit (CPU) 92 that is a processor, a read only memory (ROM) 93 and a random access memory (RAM) 94 that are storage devices, and an output section 95. Information and signals are input to the input section 91 from external devices (for example, the setting input device 20, the laser distance meter 24, and the work position display switch 27), and the input section 91 performs A/D conversion as needed. The ROM 93 is a recording medium in which a program and the like are stored, and the CPU 92 performs a predetermined computation process on the signals imported from the input section 91 and the memories 93 and 94 in accordance with the program stored in the ROM 93. The output section 95 generates a signal for output in response to a computation result in the CPU 92, and outputs the signal to an external device (for example, the monitor 21). While the controller 18 of FIG. 3 includes the semiconductor memories, i.e., the ROM 93 and the RAM 94 as the storage devices, the controller 18 may include a magnetic storage device such as a hard disk drive and store the program in this magnetic storage device.

Reference is made back to FIG. 2. The work position calculation section 30 includes a terrain data acquisition section 31, a region-to-be-excavated determination section 32, and a work position computing section 34.

Figure 6:
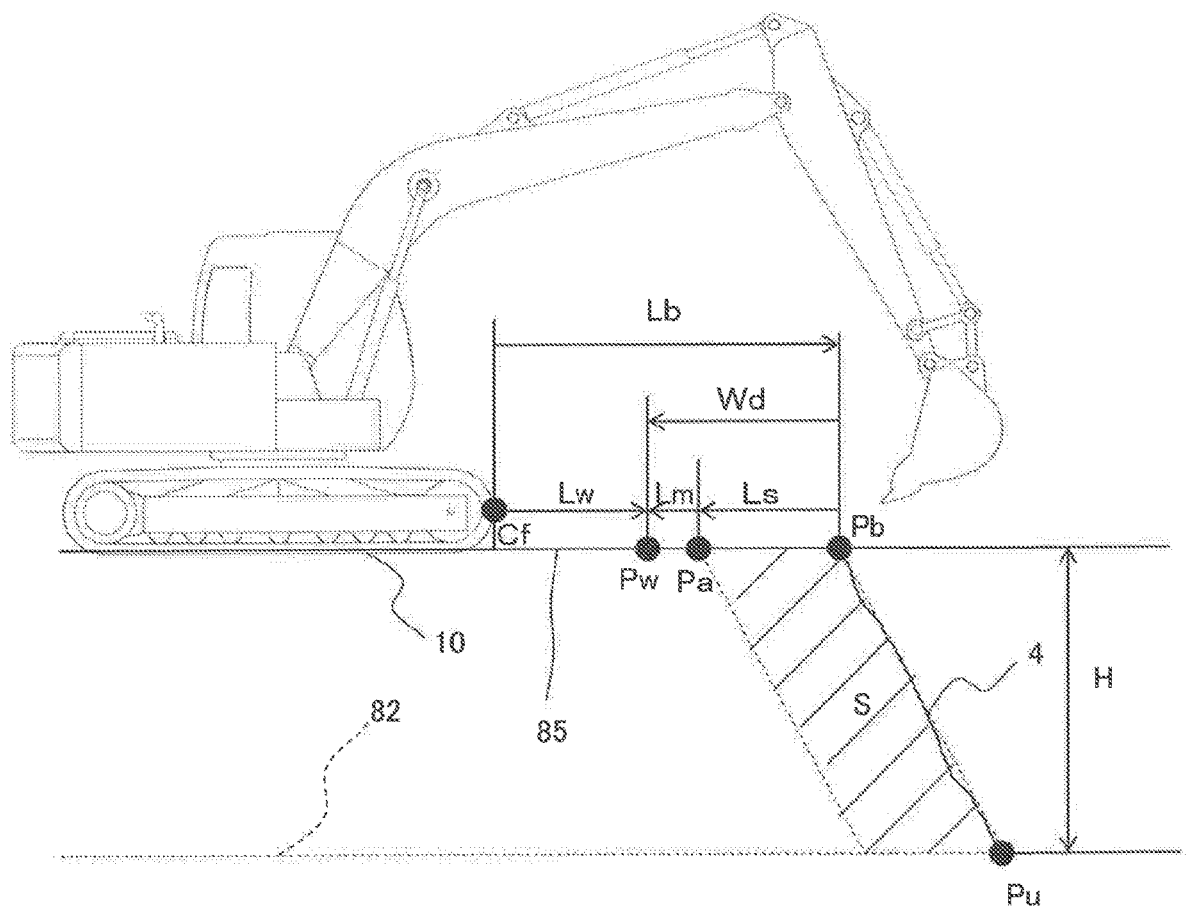
FIG. 6 is a side cross-sectional view showing a method of setting a work position with reference to a region to be excavated.

The terrain data acquisition section 31 is a section that acquires a position of an object-to-be-excavated end Pb (refer to FIG. 6) that is a point on the edge 86 of the bench upper surface 85 and a height H (refer to FIG. 6) of the bench upper surface 85 from an excavation datum surface 82 on the basis of distance information output from the laser distance meter 24. The object-to-be-excavated end Pb is a datum point at a time of calculating the work position Pw. The object-to-be-excavated end Pb may be defined in the boundary portion between the bench upper surface 85 and the surface to be excavated 4 and is not necessarily defined on the edge 86 as shown in FIG. 6 and the like (refer to FIGS. 19 and 20 to be described later for details).

In the present embodiment, it is assumed that the "object-to-be-excavated end Pb" is a point at which a plane that passes through a swing center of the excavator 1 and a center of the work device 12 intersects the edge 86 of the bench upper surface 85, and that the "datum surface 82" is a bench upper surface one step below the bench upper surface 85 on which the excavator 1 is placed or a bench bottom surface on a lowermost step.

The region-to-be-excavated determination section 32 is a section that determines a region in the object to be excavated (often referred to as "region to be excavated S") in which an assumed excavation amount (to be described later) is obtained from the object to be excavated by one excavation operation of the excavator 1 on the basis of an acquisition result of the terrain data acquisition section 31. As described later in detail, in the present embodiment, the region-to-be-excavated determination section 32 determines the region to be excavated S on the basis of the height H of the bench upper surface 85 and an area sb (to be described later) that can be derived from the assumed excavation amount.

"One excavation operation" in the present description means a series of operations performed since a state in which a claw tip of the bucket 15 touches the surface to be excavated 4 until a state in which a height of the claw tip of the bucket 15 reaches the bench upper surface 85 at the time of excavation of the bench.

Furthermore, the "assumed excavation amount" is set with reference to a capacity of the bucket 15 (bucket capacity). The bucket capacity varies by a model of the hydraulic excavator 1. For example, as a concrete assumed excavation amount, a capacity (flat stack capacity) when the bucket is filled with diggings to a level of an upper edge of the bucket or a capacity (heap capacity) when diggings are further heaped up in the bucket from the flat stack state can be used. From the viewpoint of maximizing work efficiency, it is preferable to use the heap capacity as the assumed excavation amount. However, the assumed excavation amount is not limited to a specific capacity but an arbitrary value equal to or smaller than a maximum capacity can be adopted as the assumed excavation amount. In the present embodiment, it is assumed that the heap capacity is the assumed excavation amount.

The work position computing section 34 is a section that calculates the work position (stop position) of the hydraulic excavator 1 for the next excavation operation on the basis of the region to be excavated S determined by the region-to-be-excavated determination section 32. As described later in detail, in the present embodiment, the work position computing section 34 calculates a distance Lw from the datum point (object-to-be-excavated end Pb) defined on the boundary portion between the bench upper surface 85 and the surface to be excavated 4 to the work position Pw on the basis of the region to be excavated S, and calculates the work position Pw on the basis of the distance Lw.

Next, procedures through which the work assist system for the work machine sets the work position and an example of display of the work position will be described as an example of the embodiment of the present invention, using FIGS. 4 to 8.

Figure 4:
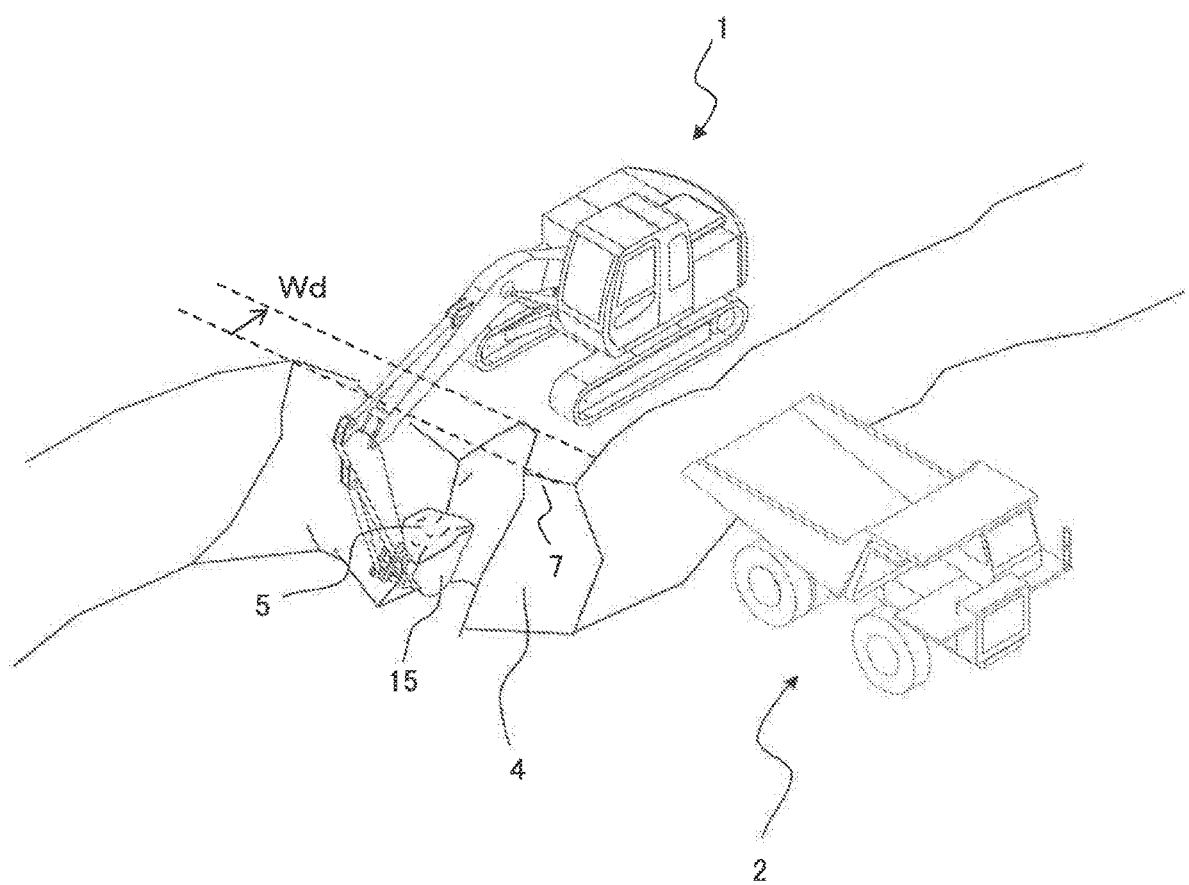
FIG. 4 is a bird's-eye view showing an example of excavation work of the hydraulic excavator, and showing a state in which the hydraulic excavator ends excavation of an object to be excavated and is loading diggings into a bucket.
Figure 5:
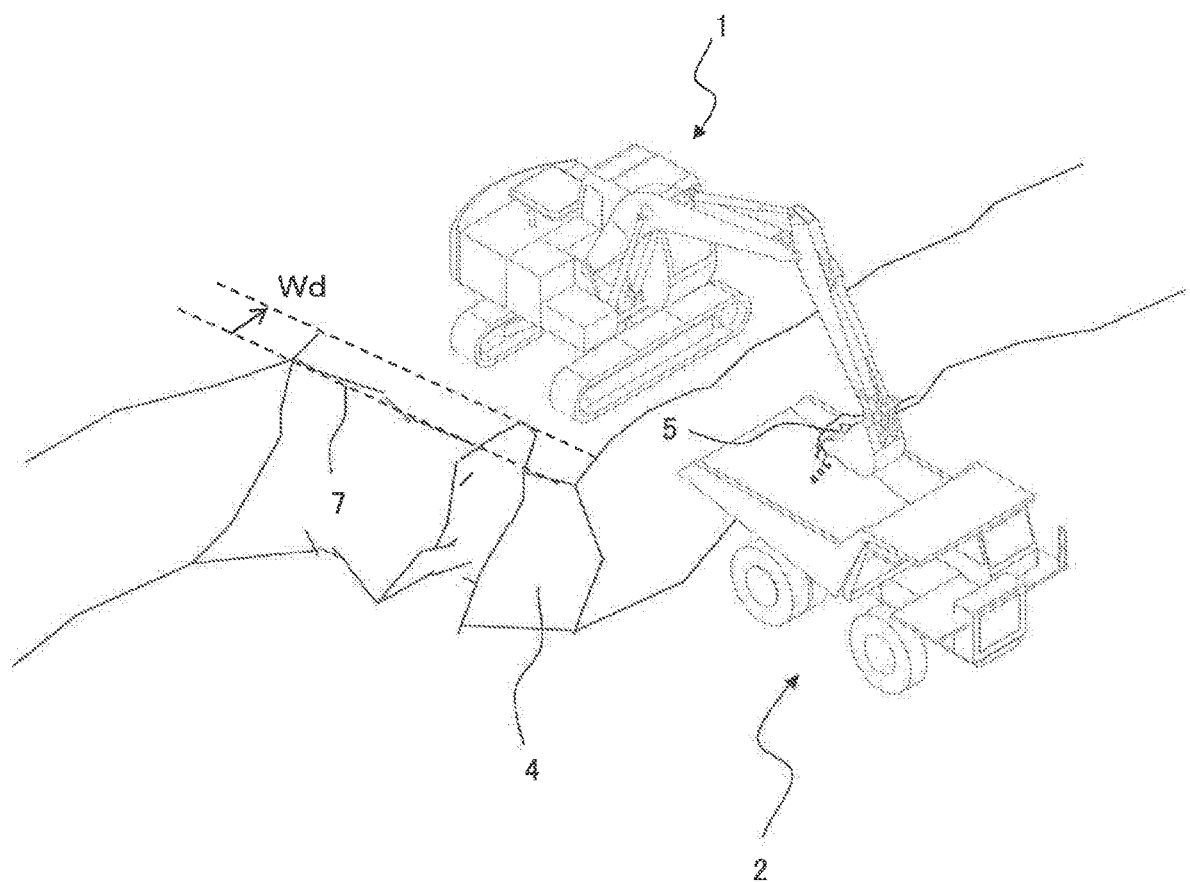
FIG. 5 is a bird's-eye view showing an example of the excavation work of the hydraulic excavator, and showing a state in which the hydraulic excavator swings after end of excavation, moves the bucket onto a cargo stand of a transporting machine, and is releasing the diggings.

FIG. 4 is a schematic diagram showing an example of the work of the hydraulic excavator 1, and showing a state in which the hydraulic excavator 1 ends excavation of the surface to be excavated 4 by one excavation operation and is loading diggings 5 into the bucket 15. FIG. 5 is a schematic diagram showing a state in which the hydraulic excavator 1 swings after end of one excavation operation, moves the bucket 15 onto a cargo stand of a transporting machine (dump truck) 2, and is releasing the diggings 5. Generally, the hydraulic excavator 1 alternately repeats excavation work and loading work shown in FIGS. 4 and 5 until the cargo stand of the transporting machine 2 is filled to capacity. Furthermore, when the excavation work is over in a region having a longitudinal excavation width Wd and present in a direction of the edge 86 in front of the hydraulic excavator 1, the hydraulic excavator 1 retreats and repeats the excavation work and the loading work again. At this time, when a predetermined excavation amount is to be kept in each excavation operation and a position of the hydraulic excavator 1 is close to a position of the object-to-be-excavated end 7, the predetermined excavation amount cannot be often secured in order to prevent a position of the bucket 15 at a time of the end of the one excavation operation from reaching a foothold of the hydraulic excavator 1.

Figure 7:
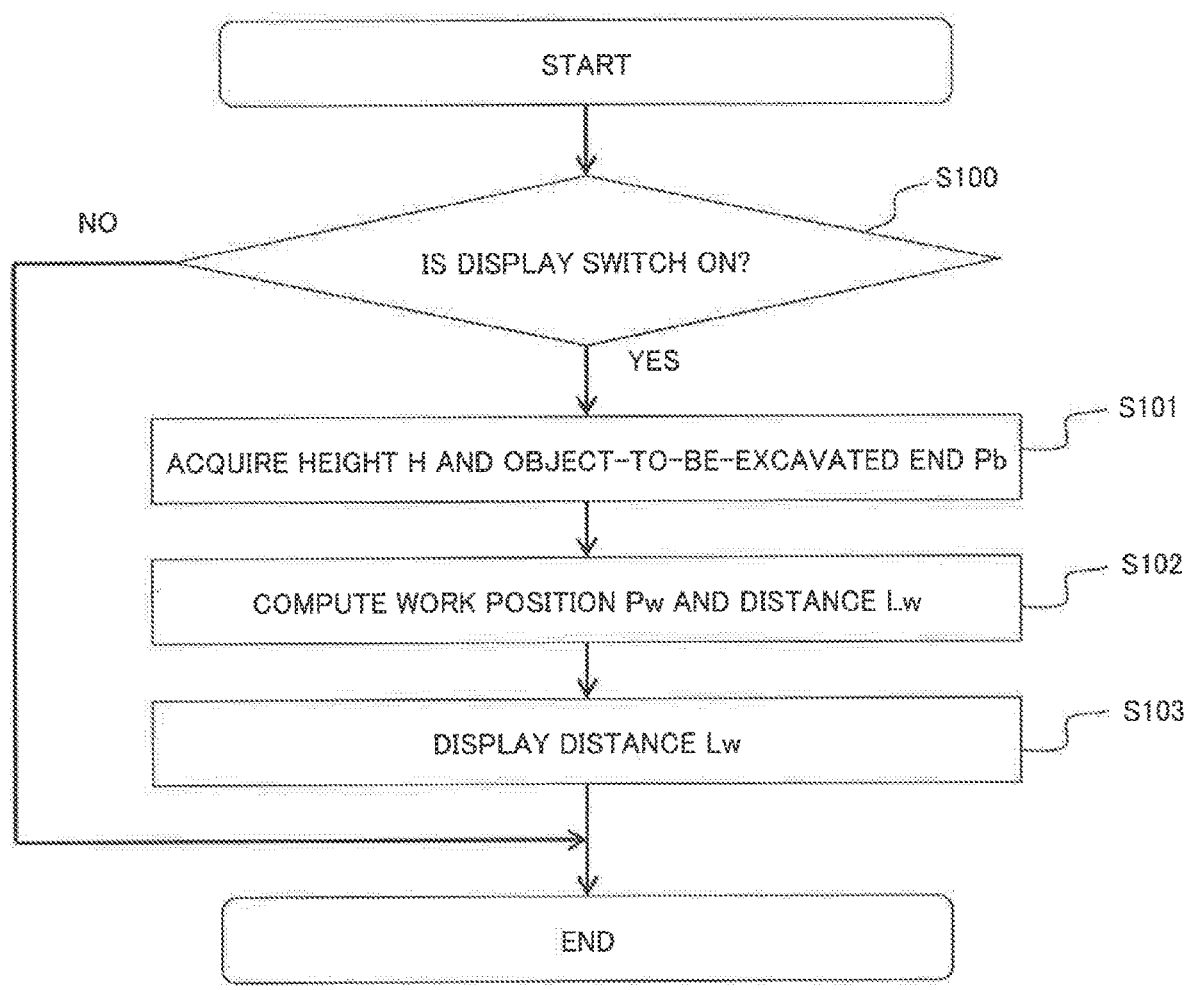
FIG. 7 is a flowchart showing a method of displaying the work position according to the first embodiment of the present invention.

FIG. 6 is a side cross-sectional view showing a position relationship between the hydraulic excavator 1 and the surface to be excavated 4 (bench cross-sectional view taken by the plane passing through the swing center of the hydraulic excavator 1 and the center of the work device 12). FIG. 7 is a flowchart showing processes performed by the work position calculation section 30. Procedures for displaying the distance Lw to the work position Pw on the monitor 21 will next be described using FIG. 7 while referring to FIG. 6.

When the processes of FIG. 7 are started, the work position calculation section 30 determines first whether the work position display switch 27 is ON in Step S100. When the work position display switch 27 is not ON, the work position calculation section 30 ends the processes without displaying anything on the monitor 21.

On the other hand, when the work position display switch 27 is ON, the region-to-be-excavated determination section 32 acquires the height H and the position of the object-to-be-excavated end Pb from the terrain data acquisition section 31 in Step 101 and proceeds to Step 102.

In Step 102, the region-to-be-excavated determination section 32 determines first the region to be excavated S on the basis of the area sb of the region to be excavated S in the side cross-sectional view of FIG. 6 and the height H acquired by the terrain data acquisition section 31, and thereby calculates an excavation amount setting distance Ls. In the present embodiment, the region to be excavated S is simplified as a parallelogram that passes through two points Pb and Pu associated with the surface to be excavated 4 and that has the constant area sb, as shown in FIG. 6. The area sb of the region to be excavated S is determined from the assumed excavation amount, and a position of an upper left vertex Pa of the parallelogram (in other words, a length of an upper side and a bottom side of the parallelogram) changes in response to a value of the height H. Owing to this, the excavation amount setting distance Ls that is the length of the upper side and the bottom side of the parallelogrammatic region to be excavated S can be calculated from sb and H by the following Equation (1).

$$Ls = sb/H \quad (1)$$

Next, the work position computing section 34 calculates the distance Wd (often referred to as "longitudinal excavation width") from the object-to-be-excavated end Pb to the work position Pw by the following Equation (2). Moreover, the work position computing section 34 calculates the work position Pw from the distance Wd and the position of the object-to-be-excavated end Pb. Lm in Equation (2) denotes a margin distance. The work position computing section 34 according to the present embodiment computes the work position Pw not as the point Pa but as a position moved from the point Pa toward the hydraulic excavator 1 by the margin distance Lm set by the setting input device 20.

$$Wd = Ls + Lm \quad (2)$$

Furthermore, the work position computing section 34 computes the work position distance Lw that is the horizontal distance from the tip end Cf of the lower travel structure 10 of the hydraulic excavator 1 to the work position Pw. The work position distance Lw is represented by the following Equation (3) using a distance Lb (often referred to as "object-to-be-excavated end distance") from the tip end Cf of the lower travel structure 10 of the hydraulic excavator 1 to the object-to-be-excavated end Pb. The distance Lb is acquired by the terrain data acquisition section 31 via the laser distance meter 24 or the wireless device 26.

$$Lw = Lb - Wd \quad (3)$$

Setting the region to be excavated S as the parallelogram as described above has a merit that it is possible to identify the work position Pw and calculate the work position distance Lw if the position of the object-to-be-excavated end Pb and the value of the height H can be acquired.

It is noted that calculation of the longitudinal excavation width Wd is not limited to the above calculation method. The work position calculation section 30 may be configured such that the longitudinal excavation width Wd is set on the basis of a calculation equation that varies depending on the setting input device 20.

Finally, the work position calculation section 30 outputs the distance Lw to the monitor 21 in Step 103 and ends the processes.

Figure 8:
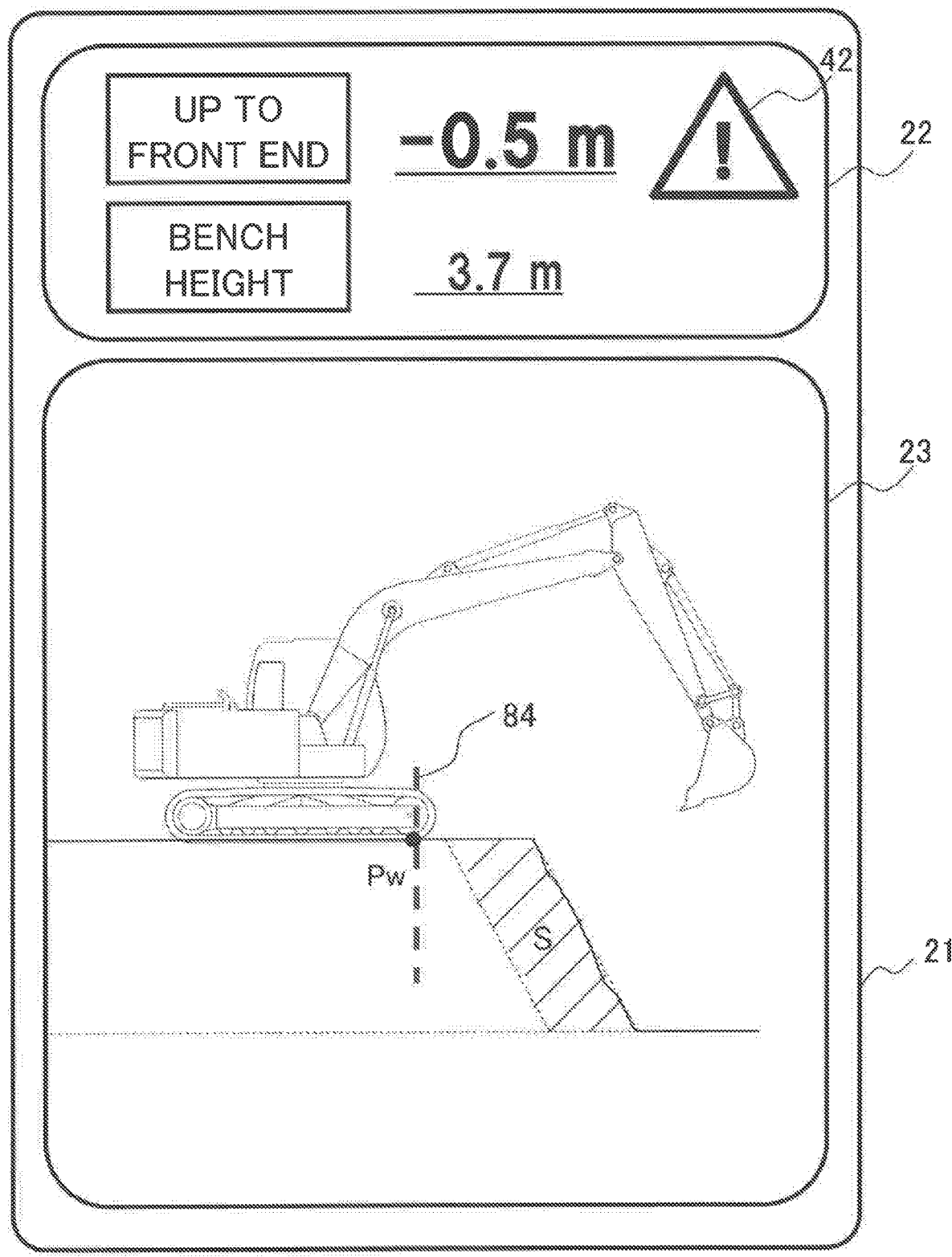
FIG. 8 shows an example of a display screen showing the work position.

FIG. 8 shows an example of display of the distance Lw to the work position Pw on the monitor 21 equipped in the operation room 17. A method of displaying the work position Pw will be described using FIG. 8.

On a screen of the monitor 21 shown in FIG. 8, a monitor upper section 22 and a monitor lower section 23 are provided as display regions.

On the monitor upper section 22, the work position distance Lw from the tip end of the lower travel structure 10 to the work position is displayed as a numerical value on the basis of an output from the work position calculation section 30 described using FIG. 7. The numerical value (−0.5 m) displayed on a right-hand side of a character string of "UP TO FRONT END" in the example of FIG. 8 indicates the distance Lw to the work position Pw.

In the example of FIG. 8, the distance Lw is a negative value. The distance Lw which is negative as shown in the example of FIG. 8 indicates that the tip end Cf of the lower travel structure 10 goes beyond the work position Pw and that the hydraulic excavator 1 should retreat. Conversely, the distance Lw which is positive indicates that the tip end Cf of the lower travel structure 10 does not reach the work position Pw and that the hydraulic excavator 1 should move forward. If the distance Lw is negative, it is preferable that a warning image 42 is displayed on the screen to alert the operator as shown in FIG. 8. A warning message may be displayed as an alternative to the warning image 42. In addition, an audio output device that outputs a warning tone or a warning voice as an alternative to the warning image 42 may be additionally installed in a similar case.

On the monitor lower section 23, an image of the side cross-sectional view of the hydraulic excavator 1 similar to that of FIG. 6 (a surface shape image of the object to be excavated) is displayed. As for display on the monitor lower section 23, a work position display line 84 that indicates the work position Pw, the region to be excavated S, and an image of the hydraulic excavator 1 are displayed in such a manner as to be superimposed on the image of the side cross-sectional view on the basis of the output from the work position calculation section 30. The image of the side cross-sectional view is generated by the controller 18 on the basis of the surface shape of the object to be excavated detected by the laser distance meter 24. It is preferable that the work position calculation section 30 is configured such that an image position of the hydraulic excavator and a posture of an image of the work device on the monitor lower section 23 are interlocked with a position and a posture of a real machine.

In this way, displaying the work position Pw and the image of the hydraulic excavator 1 makes it possible to facilitate grasping the position relationship between the work position Pw and the hydraulic excavator 1. Furthermore, displaying the region to be excavated S makes it possible to grasp a target track of the claw tip of the bucket 15 at the time of the next excavation operation and, therefore, to contribute to maximizing the excavation capacity and maintaining the work efficiency high.

As described above, the work assist system for the work machine according to the present embodiment is configured to determine the region to be excavated S on the basis of the bench height H and the assumed excavation amount in such a manner that the cross-sectional area sb of a region excavated in each of a plurality of excavation operations can be kept constant, and to calculate the position of the excavator 1 suited for excavation in the next excavation operation as the work position Pw on the basis of the region to be excavated S. In addition, the work assist system is configured to calculate the distance Lw from the frontmost end Cf of the lower travel structure 10 of the hydraulic excavator 1 to the work position Pw and to display the distance Lw on the monitor 21. Displaying the distance Lw in this way makes it possible for the operator to easily grasp the position relationship between the work position suited for the bench height H and the hydraulic excavator 1. It is thereby possible to guide the hydraulic excavator 1 to the position suited for keeping the excavation amount even when the bench height changes, and it is, therefore, possible to maintain the work efficiency high.

It is noted that the shape of the region to be excavated S is not limited to the parallelogram shown in FIG. 6. The work assist system may be configured such that the shape of the region to be excavated S is changeable into another shape by the setting input device 20. In this case, the excavation amount setting distance Ls is calculated using an equation other than Equation (1) described above. However, the distance Ls can be calculated from the area sb (assumed excavation amount) and the shape of the object to be excavated as long as the shape of the region to be excavated S is determined in advance. For example, the work assist system may be configured such that a trapezoid having part of the excavator ground contact surface 85 as an upper base, part of the datum surface 82 as a lower base, and a perpendicular to the excavator ground contact surface 85 and the surface to be excavated 4 as legs is set as the region to be excavated S. Alternatively, the work assist system may be configured such that a model form of a moving locus of the claw tip of the bucket 15 when the region having the cross-sectional area sb is excavated in one excavation operation is stored per height H, and that the shape of the region to be excavated S is selected as appropriate on the basis of the model form of the moving locus and the height H.

The work assist system has been described above on the assumption that the excavation operation starts by striking the claw tip of the bucket 15 on a point Pu located as a lower end of the surface to be excavated 4. However, it is assumed that when the bench height H is large and the point Pu is located outside of a movable range of the bucket 15, the region to be excavated S is set in such a manner that an intersecting point between a maximum range of the movable range of the bucket 15 and the surface to be excavated 4 serves as a start point of the excavation operation. In other words, the present embodiment is applicable even to a case in which the claw tip of the bucket 15 does not reach the point Pu.

If a concrete surface shape of the surface to be excavated 4 can be grasped (if the concrete surface shape can be grasped on site by the laser distance meter 24 or the like or if the concrete surface shape can be grasped in advance from information such as a working drawing), the surface shape may be used as the shape of the surface to be excavated 4 at a time of estimating the region to be excavated S and calculating the work position Pw. In this case, estimation accuracy for the region to be excavated S improves and accuracy for the work position Pw, therefore, improves. In addition, accuracy for the side cross-sectional view displayed on the monitor lower section 23 can improve.

A device that acquires the shape of the object to be excavated is not limited to the laser distance meter 24 but may be a device configured differently to be able to acquire the shape of the object to be excavated. For example, a distance surveying camera or an ultrasonic sensor can be used as an alternative to the laser distance meter 24. Furthermore, the work assist system may be configured to make work position setting using the terrain data acquired from an external computer via the wireless device 26. For example, the work assist system may be configured such that the height H is set on the basis of a work scheme acquired from a site manager at a time of acquiring the height H, or that the height H is measured by the transporting machine 2 from below the object to be excavated and transmitted to the hydraulic excavator 1. Moreover, the work assist system may be configured such that the shape of the surface to be excavated 4 at the time of the next excavation is estimated from the locus of the claw tip of the hydraulic excavator 1.

The margin distance Lm is not necessarily set at the time of calculating the longitudinal excavation width Wd (work position Pw) but may be set to zero. If the margin distance Lm is zero, the distance between the object-to-be-excavated end Pb and the work position Pw coincides with the excavation amount setting distance Ls and becomes a minimum distance.

Contents of display on the monitor 21 are not limited to contents described above. The work assist system may be configured, for example, such that a top view of the object to be excavated including the surface to be excavated 4 and the ground contact surface 85 and the hydraulic excavator 1 is displayed on the monitor lower section 23 and work positions Pw and Pws are displayed in such a manner as to be superimposed on the top view.

Second Embodiment

Figure 9:
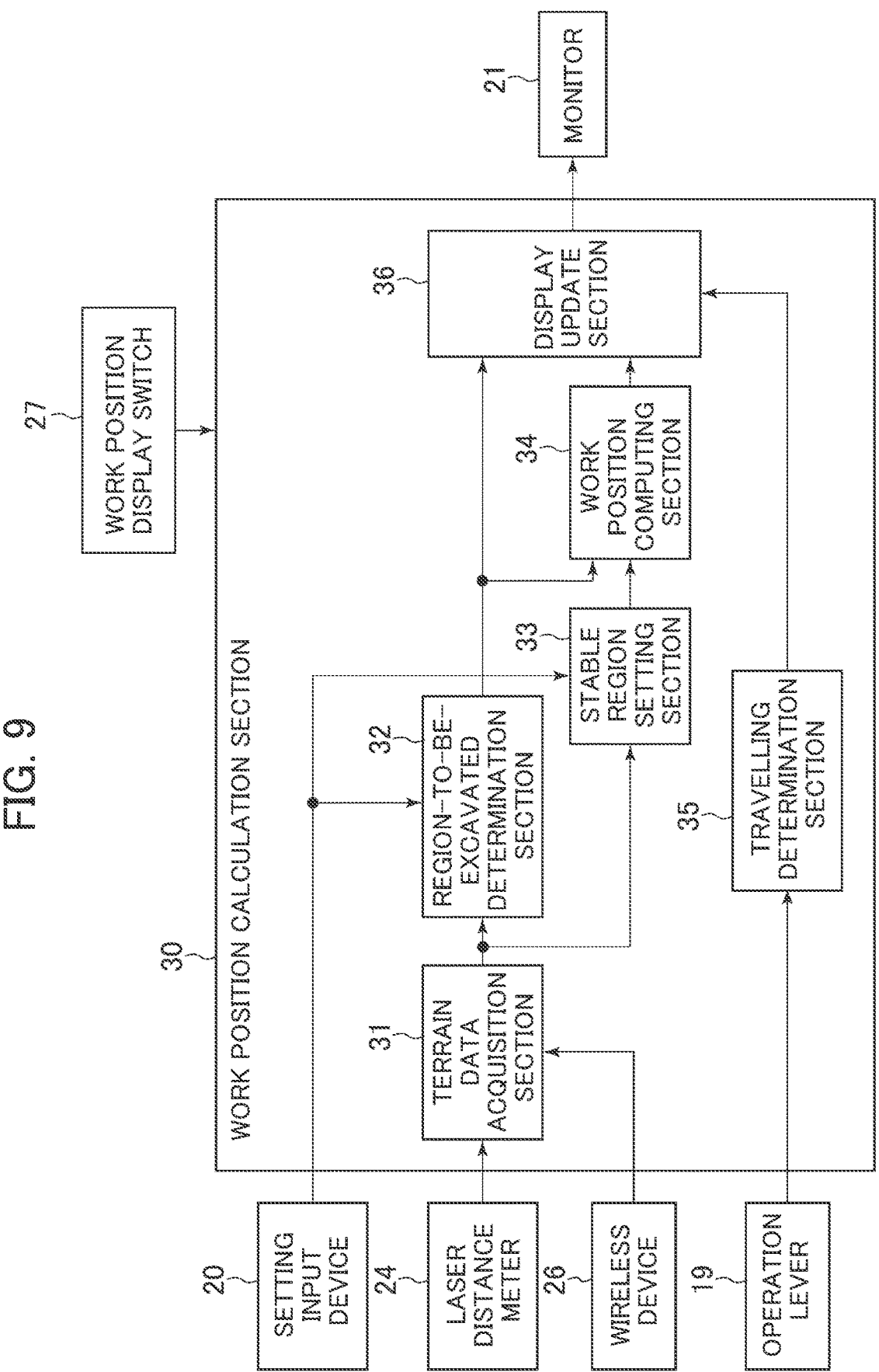
FIG. 9 is a schematic diagram showing a system configuration of a work assist system according to a second embodiment of the present invention.

FIG. 9 is a schematic diagram showing another system configuration of the work assist system for the work machine mounted in the hydraulic excavator 1 and displaying the work position. The work position calculation section 30 in this drawing includes, in addition to the configurations equipped in the work position calculation section 30 shown in FIG. 2, a stable region setting section 33, a travelling determination section 35, and a display update section 36.

The terrain data acquisition section 31 is a section that acquires the shape of the object to be excavated on the basis of the distance information output from the laser distance meter 24 and the terrain data obtained by the wireless device 26, and further acquires the height H of the object to be excavated, the position of the object-to-be-excavated end Pb, the shape of the surface to be excavated 4, and the like. The stable region setting section 33 is a section that calculates a region (often referred to as "stable region") in which the hydraulic excavator 1 can stably carry out the excavation work on an upper surface of the object to be excavated on the basis of the surface shape of the object to be excavated and a stabilizing angle "as" (refer to FIG. 10). The work position computing section 34 is a section that computes the work position (Pw or Pws) of the hydraulic excavator 1. The travelling determination section 35 is a section that determines whether a travel instruction has been issued to the hydraulic excavator 1 on the basis of an output from the operation lever (operation device) 19. The display update section 36 is a section that updates the information (for example, the distance Lw to the work position Pw or a distance Lws to the work position Pws) related to the work position (Pw or Pws) and the region to be excavated output from the work position computing section 34 on the basis of a determination of the travelling determination section 35 and displayed on the monitor 21.

Figure 10:
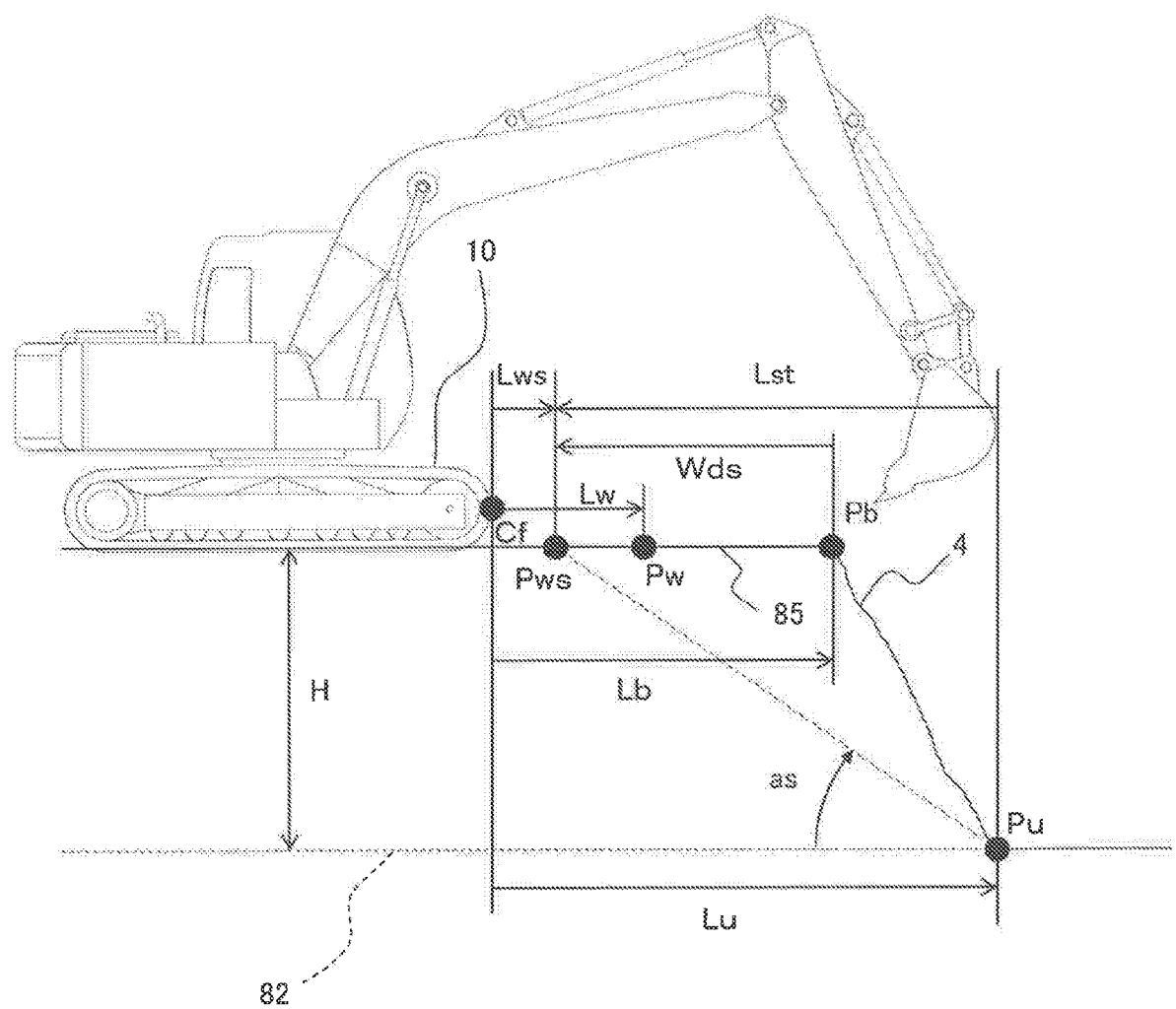
FIG. 10 is a side cross-sectional view showing a method of setting a work position with reference to a stability of an object to be excavated.

FIG. 10 is a side cross-sectional view showing a position relationship between the hydraulic excavator 1 and the surface to be excavated 4 according to a second embodiment. A method of calculating the second work position Pws determined on the basis of the stable region will be described using FIG. 10.

A second object-to-be-excavated end Pu located on a lower edge of the surface to be excavated 4 is acquired by the terrain data acquisition section 31. Next, a method of acquiring, by the terrain data acquisition section 31, a surface shape of the surface to be excavated 4 including the second object-to-be-excavated end Pu will be described using FIG. 11.

Figure 11:
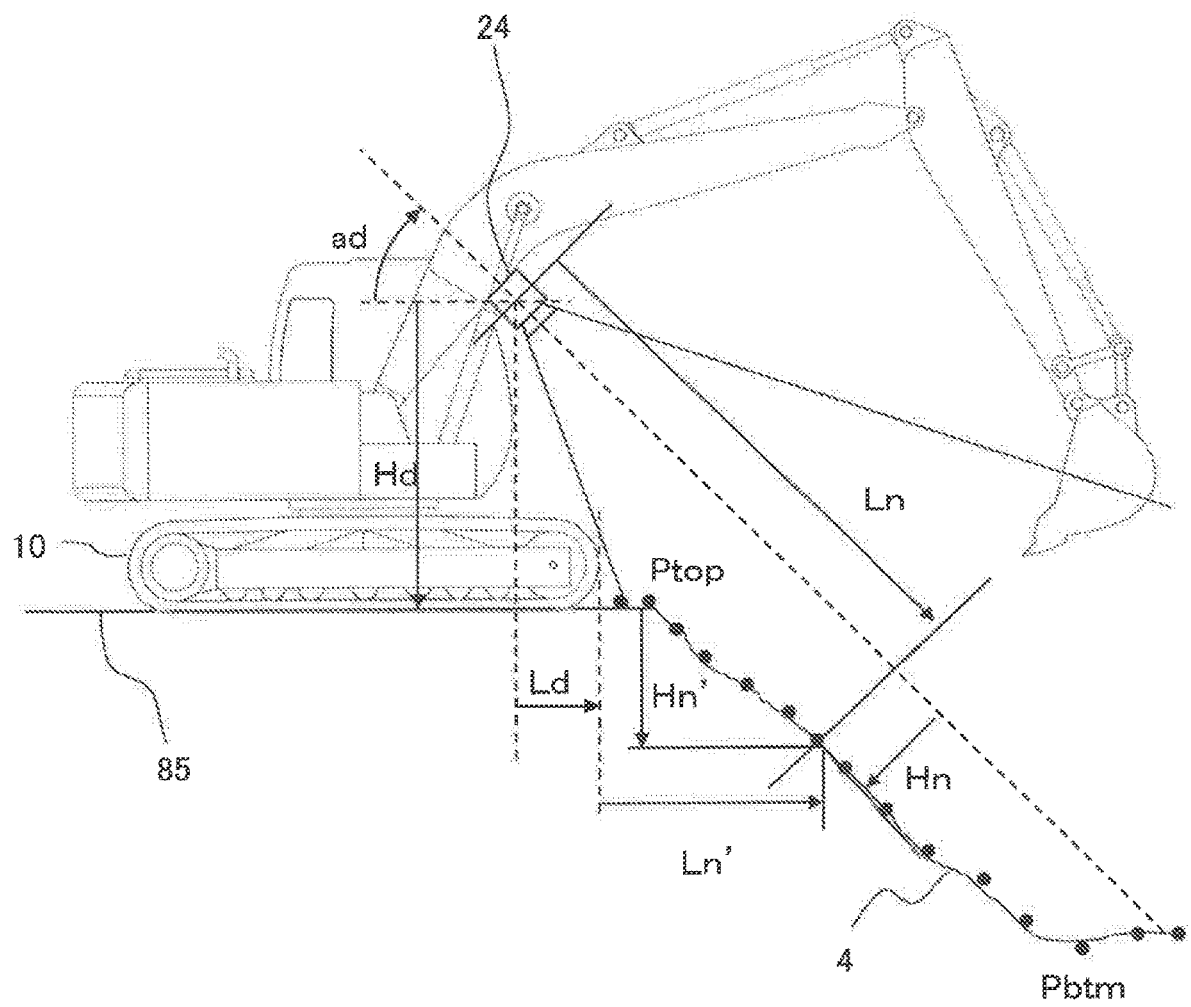
FIG. 11 is a side cross-sectional view showing a method of acquiring a shape of the object to be excavated.

FIG. 11 is a side cross-sectional view showing a position relationship among the hydraulic excavator 1, the laser distance meter 24, and the surface to be excavated 4. The laser distance meter 24 divides the surface to be excavated 4 into a point group, and outputs a point group relative horizontal distance Ln that is a relative horizontal distance of each point to the laser distance meter 24 and a point group relative vertical distance Hn. The terrain data acquisition section 31 stores a laser distance meter mounting length Ld of the laser distance meter 24, a laser distance meter mounting height Hd with respect to the excavator ground contact surface 85, and the laser distance meter mounting angle ad with respect to the excavator ground contact surface 85. The terrain data acquisition section 31 converts an output from the laser distance meter 24 (the point group relative horizontal distance Ln and the point group relative vertical distance Hn) into a point group horizontal distance Ln' and a point group vertical distance Hn' with respect to the tip end Cf of the lower travel structure 10 on the basis of the mounting information of the laser distance meter 24 (length Ld, height Hd, and angle ad). Ln' and Hn' are obtained by conversion by the following Equation (7) using a rotation matrix.

$$Ln' = Ln \times \cos(ad) - Hn \times \sin(ad) - Ld$$

$$Hn' = Ln \times \sin(ad) + Hn \times \cos(ad) - Hd \quad (7)$$

The terrain data acquisition section 31 acquires the surface shape of the object to be excavated with respect to the tip end Cf of the lower travel structure 10 by conducting similar calculation for all the points included in the point group. While the shape of the surface to be excavated 4 is described as a two-dimensional shape in a side cross-section in the description using FIG. 11, the shape may be converted into a three-dimensional shape of the object to be excavated by using a three-dimensional rotation matrix.

The terrain data acquisition section 31 calculates all of tilts between two adjacent points among the point group constituting the surface to be excavated 4, and detects points Ptop and Pbtm for which the tilt radidly changes. The terrain data acquisition section 31 outputs and stores the point Ptop having a larger altitude as the object-to-be-excavated end Pb and the point Pbtm having a smaller altitude as the second object-to-be-excavated end Pu on the basis of the altitudes of the points Ptop and Pbtm. The terrain data acquisition section 31 also outputs and stores a difference between the altitudes of the points Ptop and Pbtm as the height H.

Figure 12:
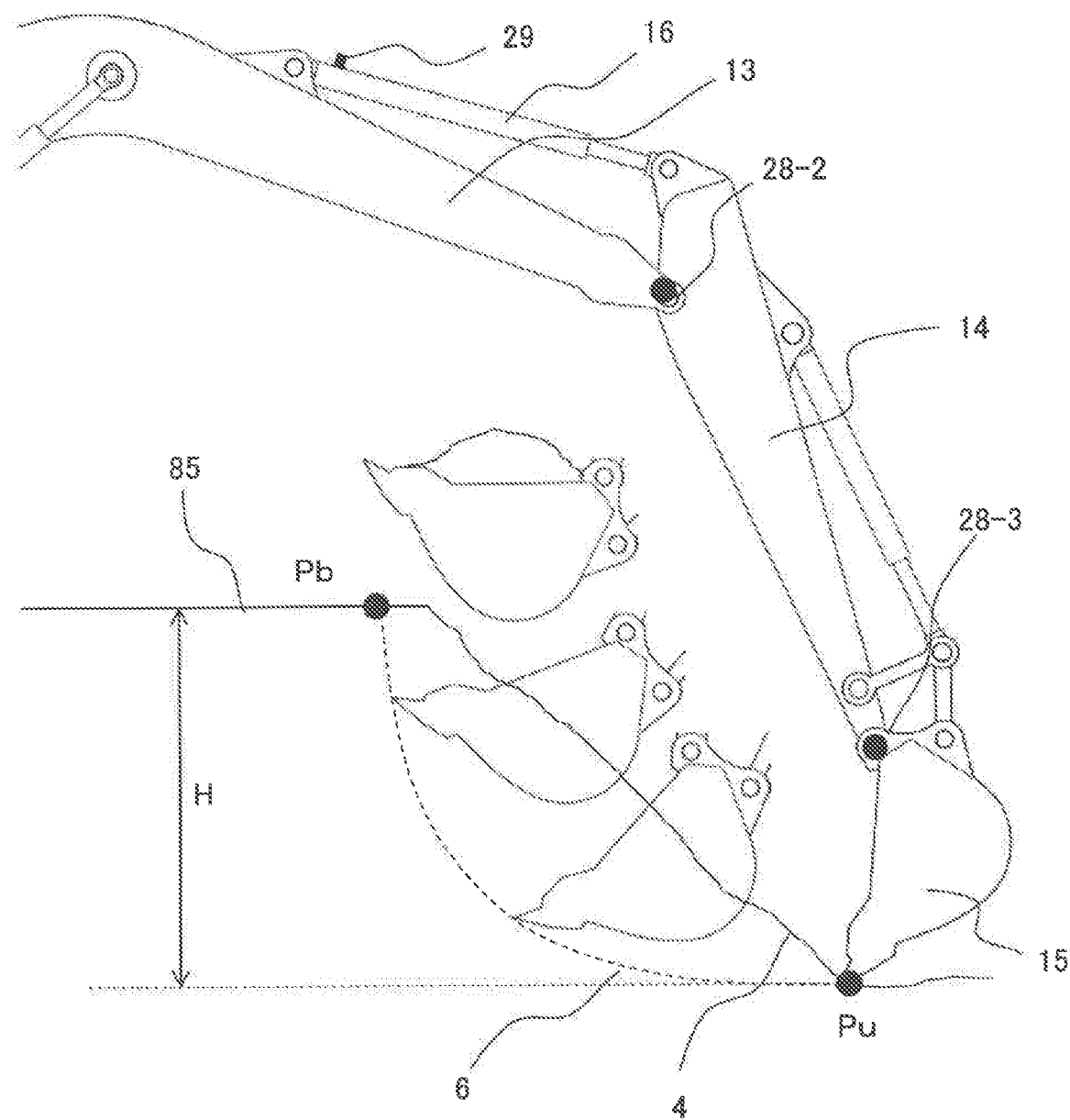
FIG. 12 is a side cross-sectional view showing a different method of acquiring the shape of the object to be excavated.

Another method of acquiring positions of the object-to-be-excavated end Pb and the second object-to-be-excavated end Pu will next be described using FIG. 12. FIG. 12 is a side cross-sectional view showing the method of acquiring the positions of the object-to-be-excavated ends Pb and Pu on the basis of the locus of the claw tip of the bucket 15 in the excavation work.

The front work device 12 is equipped with a boom angle sensor 28-1 (not shown), an arm angle sensor 28-2, and a bucket angle sensor 28-3 measuring rotation angles of the boom 13, the arm 14, and the bucket 15, and an arm cylinder pressure sensor 29 measuring an internal pressure of the arm cylinder 16. Furthermore, the controller 18 stores dimensions of the boom 13, the arm 14, and the bucket 15, and is configured to be able to compute a position of the claw tip of the bucket 15 on the basis of these dimensions and outputs from the angle sensors 28-1, 28-2, and 28-3.

When acquiring the positions of the object-to-be-excavated end Pb and the second object-to-be-excavated end Pu, the controller 18 first monitors an output from the pressure sensor 29, determines time at which a load of the arm cylinder 16 increases to be greater than a predetermined value as start of excavation, and sets the position of the claw tip of the bucket 15 at that time as the second object-to-be-excavated end Pu. The controller 18 then monitors the position of the claw tip of the bucket 15 after the start of excavation, determines time at which a height of the claw tip of the bucket 15 becomes larger than a height of the excavator ground contact surface 85 as end of excavation, and sets the position of the claw tip of the bucket 15 at that time as the object-to-be-excavated end Pb.

Reference is made back to FIG. 10. The stabilizing angle (repose angle) "as" is a maximum tilt angle of the surface to be excavated 4 of the bench at which the surface to be excavated 4 is spontaneously stable without sliding, and is set for the second object-to-be-excavated end Pu. A value of the stabilizing angle "as" varies depending on a soil quality of the bench and is stored in a storage device within the controller 18 in advance via the setting input device 20 or the like. The stable region setting section 33 calculates a horizontal distance Lst (often referred to as "object-to-be-excavated stable distance") from the second object-to-be-excavated end Pu to the position Pws at which the object to be excavated become stable using the stabilizing angle "as" and the height H on the basis of the following Equation (4).

$$Lst = H / \tan(as) \quad (4)$$

Next, the work position computing section 34 calculates a horizontal distance Lws (often referred to as "second work position distance") from the tip end Cf of the lower travel structure 10 to the second work position Pws. The second work position distance Lws is represented by the following Equation (5) using a horizontal distance Lu from the tip end Cf of the lower travel structure 10 to the second object-to-be-excavated end Pu. It is noted that the horizontal distance Lu is acquired by the terrain data acquisition section 31 via the laser distance meter 24 or the wireless device 26.

$$Lws = Lu - Lst \quad (5)$$

At this time, a horizontal distance Wds (often referred to as "second longitudinal excavation width") from the object-to-be-excavated end Pb to the second work position Pws is represented by the following Equation (6) using a horizontal distance Lb (often referred to as "object-to-be-excavated end distance") from the tip end Cf of the lower travel structure 10 of the hydraulic excavator 1 to the object-to-be-excavated end Pb.

$$Wds = Lb - Lws \quad (6)$$

The work position computing section 34 compares a magnitude of the second longitudinal excavation width Wds with a magnitude of the longitudinal excavation width Wd and sets the position using the larger longitudinal excavation width as the work position. For example, when the second longitudinal excavation width is larger, the work position computing section 34 sets the position Pws using the second longitudinal excavation width Wds as the work position.

Figure 13:
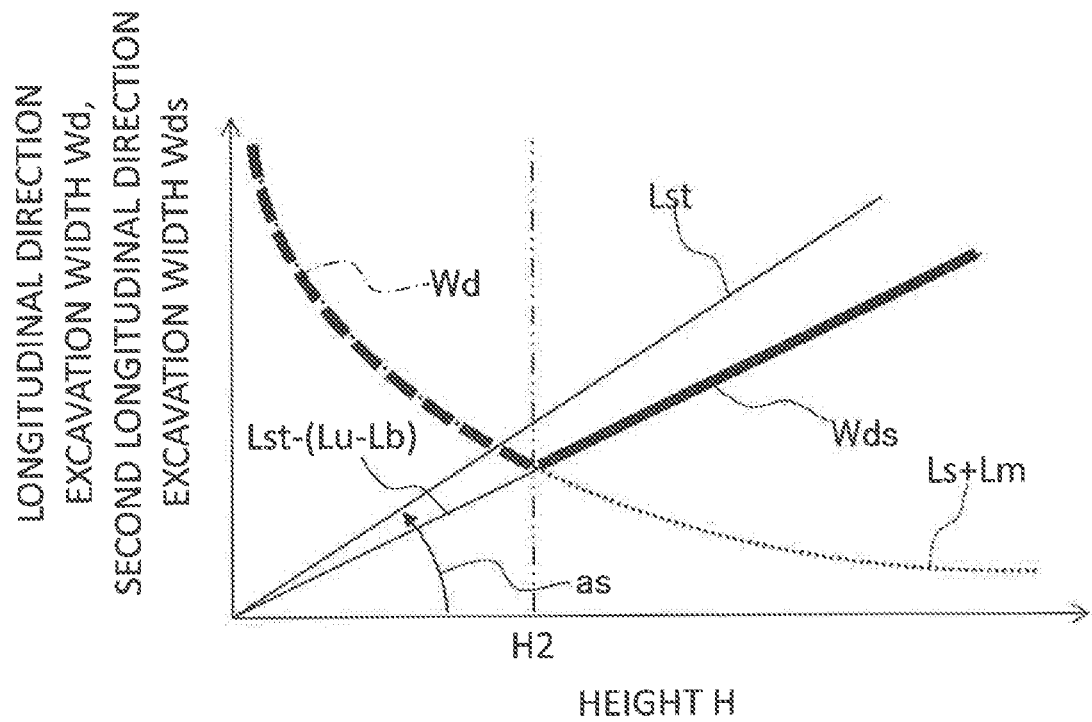
FIG. 13 is a graph showing work positions relative to a height of the object to be excavated.

FIG. 13 is a graph showing values of the longitudinal excavation width Wd and the second longitudinal excavation width Wds relative to the height H. Changes of the longitudinal excavation width Wd and the second longitudinal excavation width Wds calculated on the basis of the method described above with the height H will be described using FIG. 10.

As already described, as the height H is smaller, the work position distance Ls necessary to secure the predetermined area sb becomes longer and, at the same time, the longitudinal excavation width Wd becomes larger, so that the work position Pw is farther from the object-to-be-excavated end Pb. On the other hand, as the height H is larger, the excavation amount setting distance Ls necessary to secure the predetermined area sb becomes shorter and, at the same time, the longitudinal excavation width Wd becomes smaller, so that the work position Pw is closer to the object-to-be-excavated end Pb.

The object-to-be-excavated stable distance Lst increases as the height H increases. Therefore, the second longitudinal excavation width Wds increases as the height H increases. The work position computing section 34 compares the longitudinal excavation width Wd with the second longitudinal excavation width Wds and sets the position using the larger value as the work position. As shown in FIG. 13, (A) in a region in which the height H is smaller than H2, the longitudinal excavation width Wd is larger and the work position Pw using the longitudinal excavation width Wd is, therefore, output. (B) When the height H is H2, the longitudinal excavation width Wd is identical to the second longitudinal excavation width Wds. For the sake of convenience, therefore, the work position Pw using the longitudinal excavation width Wd is output (or the second work position Pws may be output). (C) In a region in which the height H is larger than H2, the second longitudinal excavation width Wds is larger and the second work position Pws using the second longitudinal excavation width Wds is, therefore, output.

Figure 14:
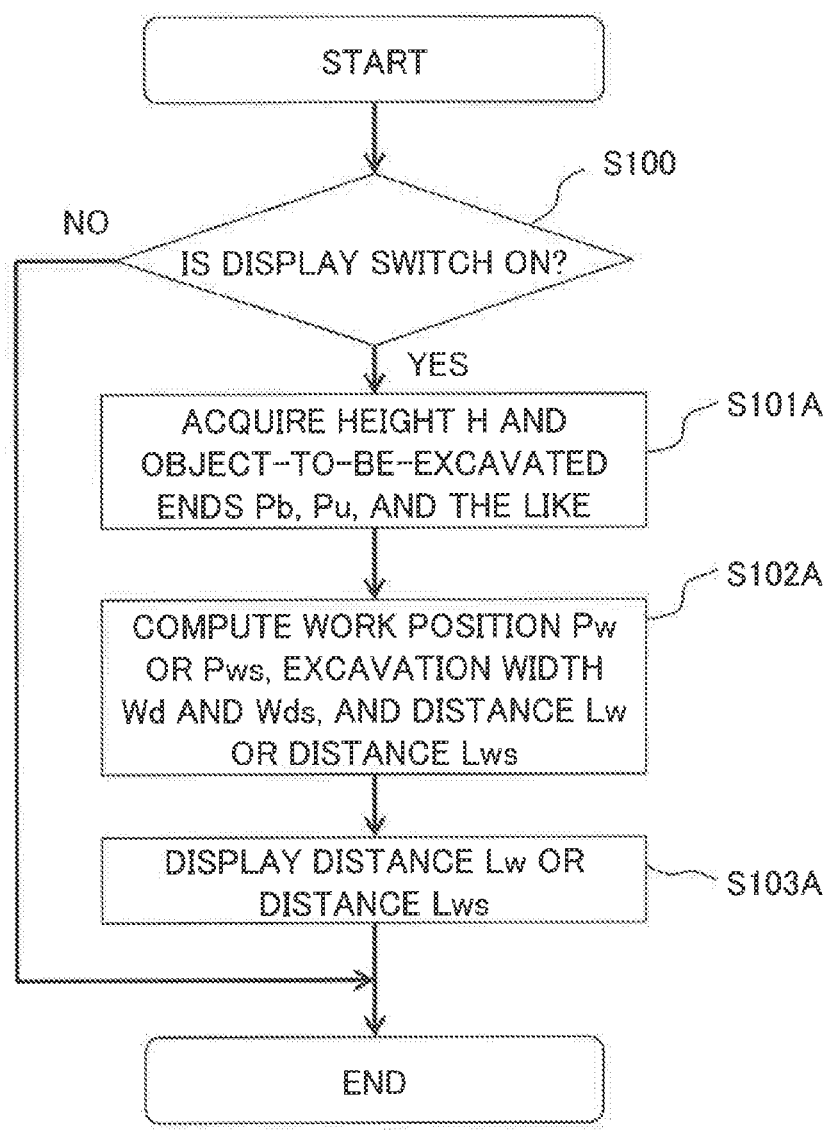
FIG. 14 is a flowchart showing a method of displaying the work position according to the second embodiment of the present invention.

FIG. 14 is a flowchart showing processes performed by the work position calculation section 30 according to the second embodiment. A method of displaying the work position will be described using FIG. 14. Same processes as those in the preceding drawing (FIG. 7) are denoted by the same numbers and description thereof is often omitted (the same thing is true for subsequent flowcharts).

When the work position display switch 27 is ON, the region-to-be-excavated determination section 32 and the stable region setting section 33 acquire the terrain data (for example, the height H, the positions of the object-to-be-excavated ends Pb and Pu, the horizontal distance Lu, and the shape of the surface to be excavated 4) necessary to determine the work positions Pw and Pws and to compute the longitudinal excavation widths Wd and Wds from the terrain data acquisition section 31 in Step 101A.

Next, in step 102A, the region-to-be-excavated determination section 32 estimates the region to be excavated S by the method already described. The work position computing section 34 calculates the excavation amount setting distance Ls using the area sb, the height H, and the above Equation (1), adds the margin Lm to the excavation amount setting distance Ls to calculate the longitudinal excavation width Wd (above Equation (2)).

Furthermore, the stable region setting section 33 calculates the object-to-be-excavated stable distance Lst using the above Equation (4). The work position computing section 34 calculates the second work position distance Lws using the above Equation (5), and calculates the second longitudinal excavation width Wds using the above Equation (6).

Moreover, the work position computing section 34 compares the magnitudes of the two longitudinal excavation widths Wd and Wds with each other, computes the distance (Lw or Lws) to the work position (Pw or Pws) related to the larger longitudinal excavation width, and outputs the distance to the display update section 36.

Finally, the display update section 36 outputs the distance (Lw or Lws) to the monitor 21 in Step 103A and the work position calculation section 30 ends the processes. It is noted that a display form of the distance (Lw or Lws) on the monitor 21 is assumed as the same as that shown in FIG. 8 and description thereof is omitted.

As described above, the work assist system for the work machine according to the present embodiment compares the magnitude of the longitudinal excavation width Wd calculated on the basis of the region to be excavated S with the magnitude of the second longitudinal excavation width Wd derived on the basis of the stabilizing angle "as" of the object to be excavated, and displays the distance (Lw or Lws) to the work position (Pw or Pws) related to the larger longitudinal excavation width on the monitor 21. With such a configuration, the hydraulic excavator 1 is always disposed in the stable region, so that continuation of the stable excavation work is ensured.

Third Embodiment

Figure 15:
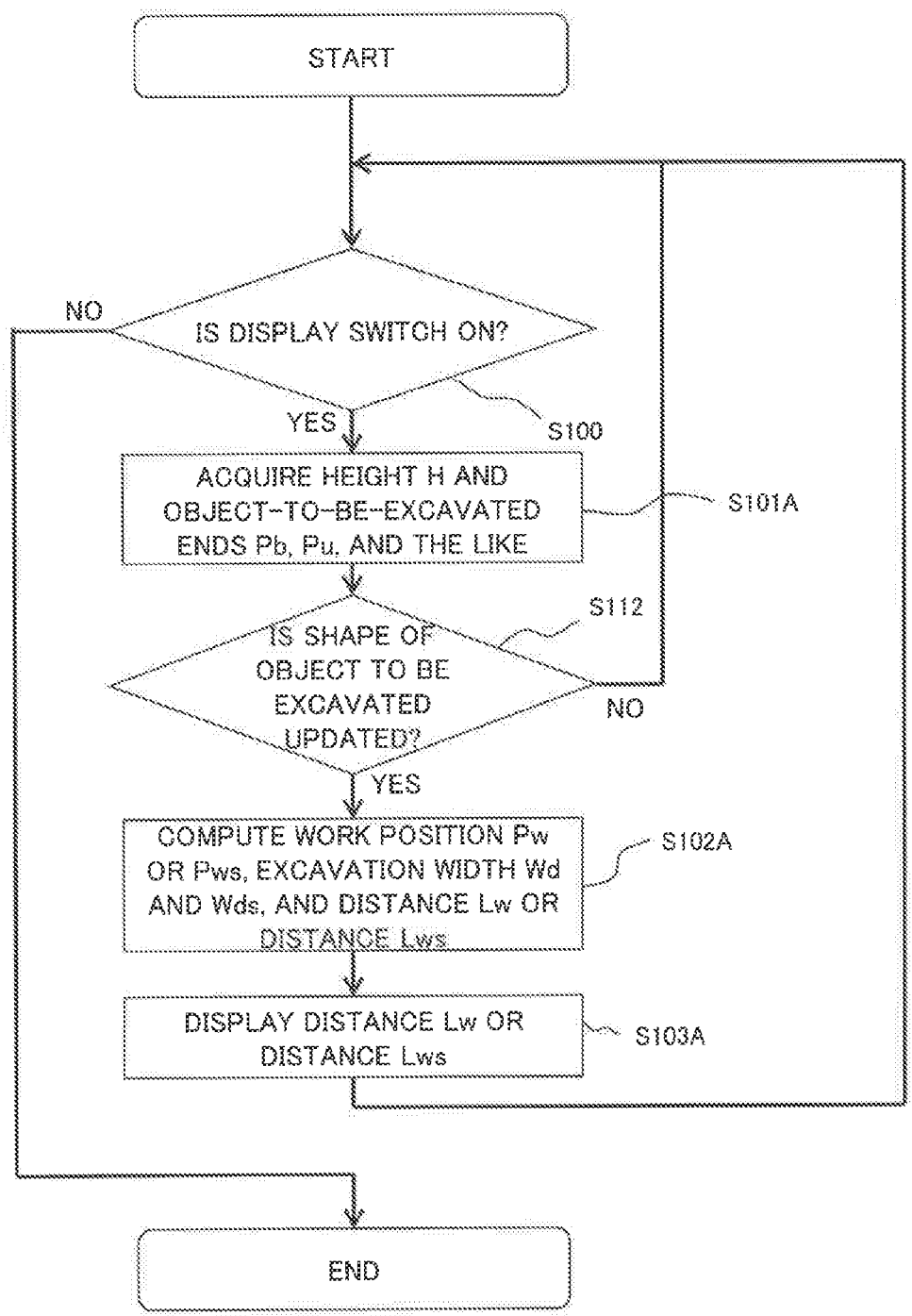
FIG. 15 is a flowchart showing a method of displaying the work position according to a third embodiment of the present invention.

A configuration of a work assist system for a work machine according to the present embodiment is assumed as the same as that shown in FIG. 9. FIG. 15 is a flowchart showing processes performed by the work position calculation section 30 according to a third embodiment.

The processes up to Step 101A are similar to those in the preceding flowchart. In Step 112, the terrain data acquisition section 31 determines whether the surface shape of the object to be excavated is changed on the basis of the terrain data acquired in Step 101A. When the surface shape of the object to be excavated is not changed, the work position calculation section 30 returns to Step S100. When the surface shape of the object to be excavated is changed, the work position calculation section 30 proceeds to Steps 102A and 103A. The display update section 36 displays the distance Lw or Lws on the monitor 21 and updates the display screen. After update of the display screen of the monitor 21, the work position calculation section 30 returns to Step S100 and repeats the processes already described.

In this way, the work assist system for the work machine according to the present embodiment updates monitor display of the distance (Lw or Lws) to the work position for the next excavation operation when it is confirmed that the surface shape of the object to be excavated has changed. If the system is configured in this way, then the distance to the work position is automatically updated as the shape of the object to be excavated changes, and the work efficiency can be, therefore, improved.

Fourth Embodiment

Figure 16:
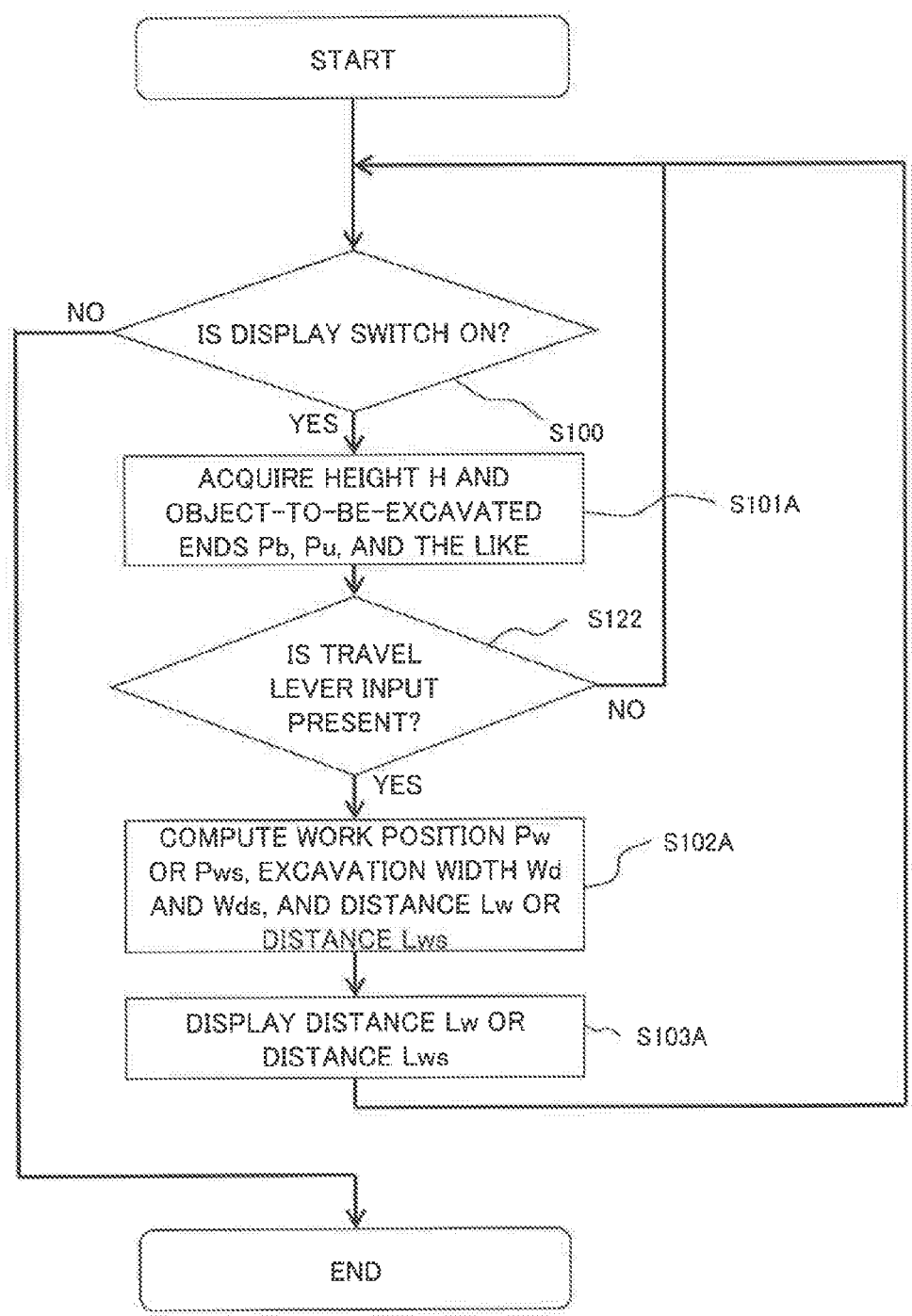
FIG. 16 is a flowchart showing a method of displaying the work position according to a fourth embodiment of the present invention.

A configuration of a work assist system for a work machine according to the present embodiment is also assumed as the same as that shown in FIG. 9. FIG. 16 is a flowchart showing processes performed by the work position calculation section 30 according to a fourth embodiment.

The processes up to Step 101A are similar to those in the preceding flowchart. In Step 122, the travelling determination section 35 determines whether an input from a lever (travel lever) for instructing the hydraulic excavator 1 to travel has been done via the operation lever 19. When the input from the travel lever (instruction of moving forward or retreat of the lower travel structure 10) has not been done, the work position calculation section 30 returns to Step S100 in a state in which the distance (Lw or Lws) to the work position for the next excavation operation is maintained displayed on the monitor 21. When the input from the travel lever have been done, the work position calculation section 30 proceeds to Step 102A and 103A. The display update section 36 displays the distance Lw or Lws on the monitor 21 and updates the display screen. After update of the display screen of the monitor 21, the work position calculation section 30 returns to Step S100 and repeats the processes already described.

In this way, the work assist system for the work machine according to the present embodiment continues to update the monitor display of the distance (Lw or Lws) to the work position for the next excavation operation while the input from the travel lever is done. If the system is configured in this way, then the distance to the work position is automatically updated as the hydraulic excavator 1 moves by the travel lever, and the work efficiency can be, therefore, improved.

While the configuration of updating the distance on the basis of presence or absence of the lever input from the operation lever 19 is adopted in the present embodiment, a configuration of detecting the operation of the lower travel structure 10 that is a travel device of the hydraulic excavator 1 and updating the distance may be adopted. Similarly, a configuration of detecting an operation of a drive source (a hydraulic motor or an electric motor) of the lower travel structure 10 and updating the distance may be adopted. Furthermore, for example, a position of the transporting machine (dump truck) is monitored and the distance may be updated at timing of detecting that the transporting machine starts to move. Moreover, an operation that acts as a trigger for the update of the display is not limited to travelling but the display may be updated with reference to another operation. For example, operations of the hydraulic excavator are classified into an excavation operation, a swing operation, and a loading operation, and the work assist system may be configured to update the work position after the loading operation is detected.

The third embodiment and the fourth embodiment described above can be combined. That is, the work assist system may be configured to calculate anew the distance to the work position for the next excavation operation and display the calculation result on the monitor 21 when at least one of followings is confirmed: a change of the surface shape of the object to be excavated; an input from the travel lever; and an operation of the lower travel structure 10 (an operation of the hydraulic excavator 1).

Figure 17:
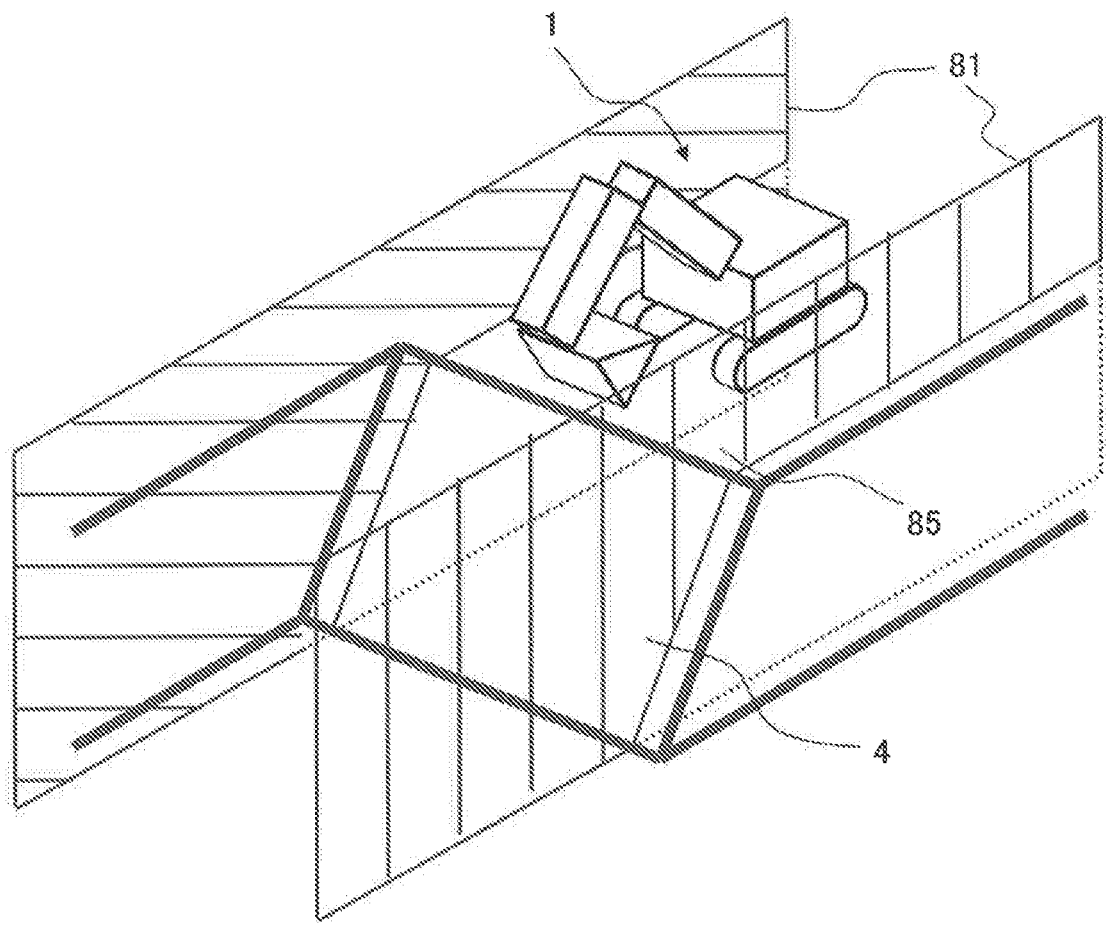
FIG. 17 is a schematic diagram showing a work range of the work machine.
Figure 18:
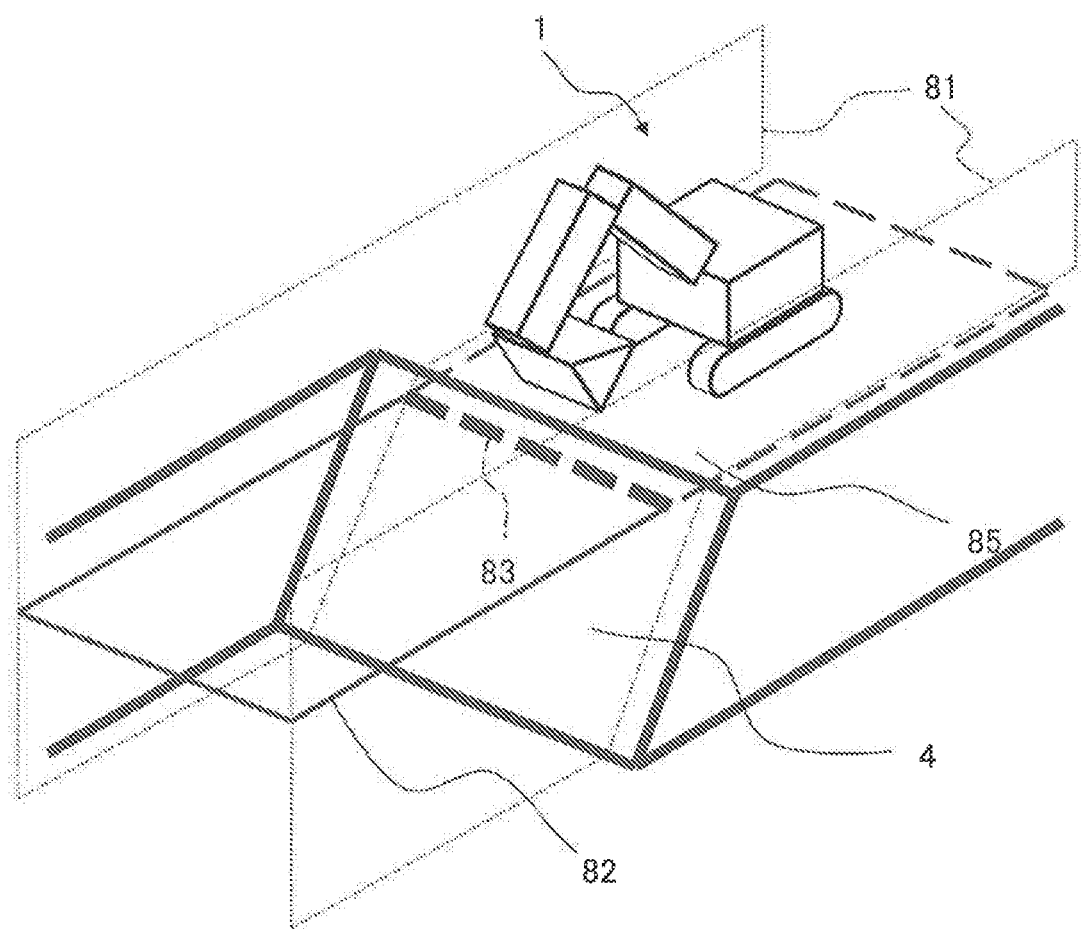
FIG. 18 is a bird's-eye view showing a relationship between an object-to-be-excavated end datum line and an object-to-be-excavated end Pb.
Figure 19:
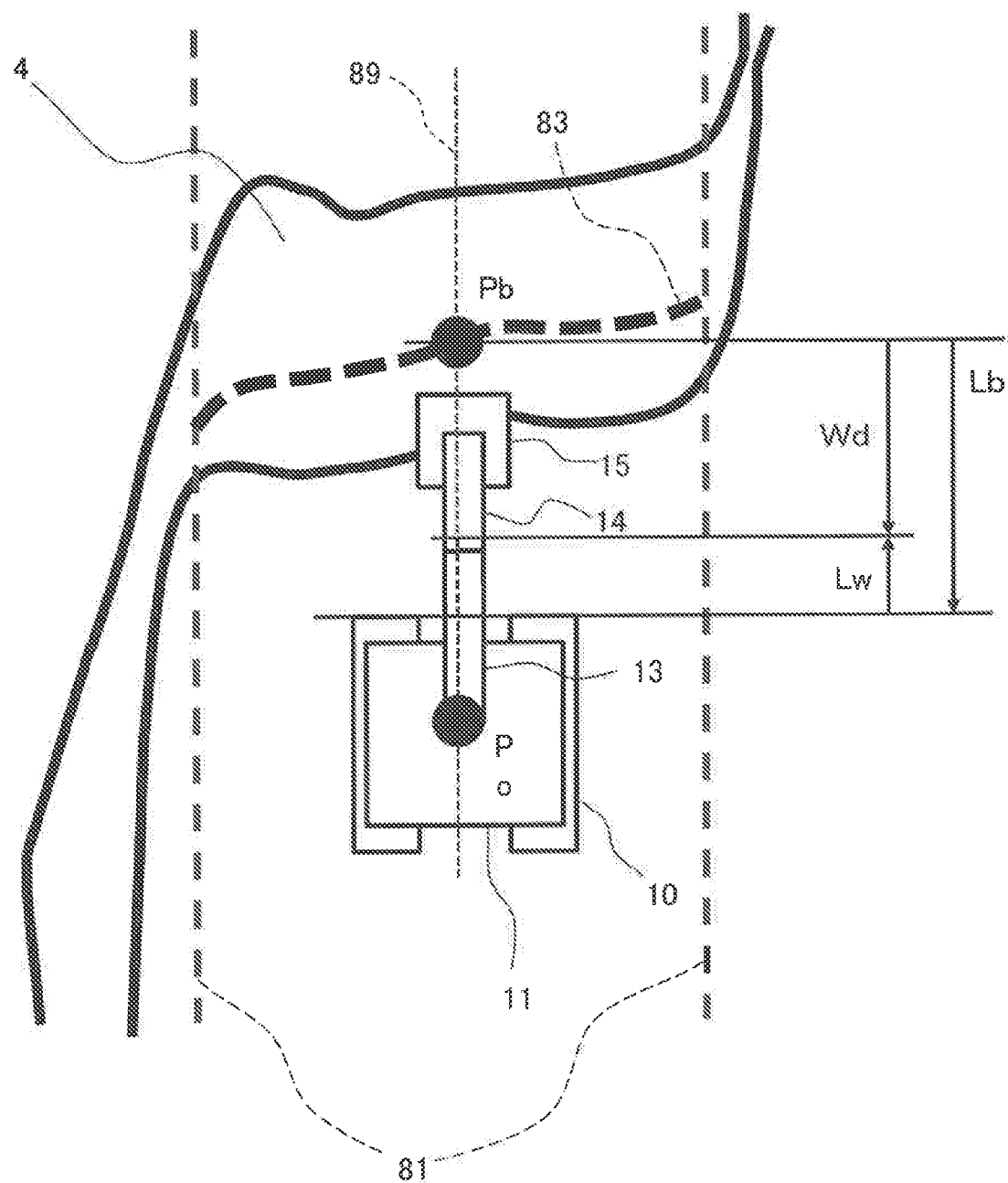
FIG. 19 is a top view showing a relationship between the object-to-be-excavated end datum line and the object-to-be-excavated end Pb.

Meanwhile, the method of setting the object-to-be-excavated ends Pb and Pu is not limited to the above method. Another method of setting, by the terrain data acquisition section 31, the object-to-be-excavated end Pb will be described using FIGS. 17 to 19. FIG. 17 is a bird's-eye view showing a work range for the hydraulic excavator 1 and the surface to be excavated 4. FIG. 18 is a bird's-eye view showing an object-to-be-excavated end datum line 83 generated by intersection between the datum surface (datum altitude surface) 82 and the surface to be excavated 4 when the datum surface 82 is set with respect to the excavator ground contact surface 85 of the hydraulic excavator 1. FIG. 19 is a top view showing a relationship among the hydraulic excavator 1, the object-to-be-excavated end datum line 83 shown in FIG. 18, and the object-to-be-excavated end Pb.

As shown in FIG. 17, the terrain data acquisition section 31 sets a work range 81 that specifies a movable range of the hydraulic excavator 1 in a horizontal direction when the hydraulic excavator 1 faces a direction of the surface to be excavated 4 on the basis of set values of the setting input device 20, by two planes parallel to each other. Next, as shown in FIG. 18, the setting input device 20 sets the horizontal surface (datum surface) 82 at a height in the vicinity of the ground contact surface 85 as an alternative to the excavator ground contact surface 85 in such a manner that the datum surface 82 intersects the surface to be excavated 4. The object-to-be-excavated end datum line 83 located between the two planes that specify the work range 81 and generated by intersection between the surface to be excavated 4 and the datum surface 82 is acquired. Next, as shown in FIG. 19, an intersecting point between a plane 89 that passes through a swing center Po of the hydraulic excavator 1 and that is parallel to the two planes specifying the work range 81 and the object-to-be-excavated end datum line 83 is set as the object-to-be-excavated end Pb.

By setting the datum surface 82 and setting the object-to-be-excavated end Pb in this way, it is possible to set the object-to-be-excavated end Pb even if the edge 86 (refer to FIG. 1) of the bench upper surface cannot be detected by, for example, the laser distance meter 24 or the like (for example, if the ground contact surface 85 smoothly transitions to the surface to be excavated 4).

Figure 20:
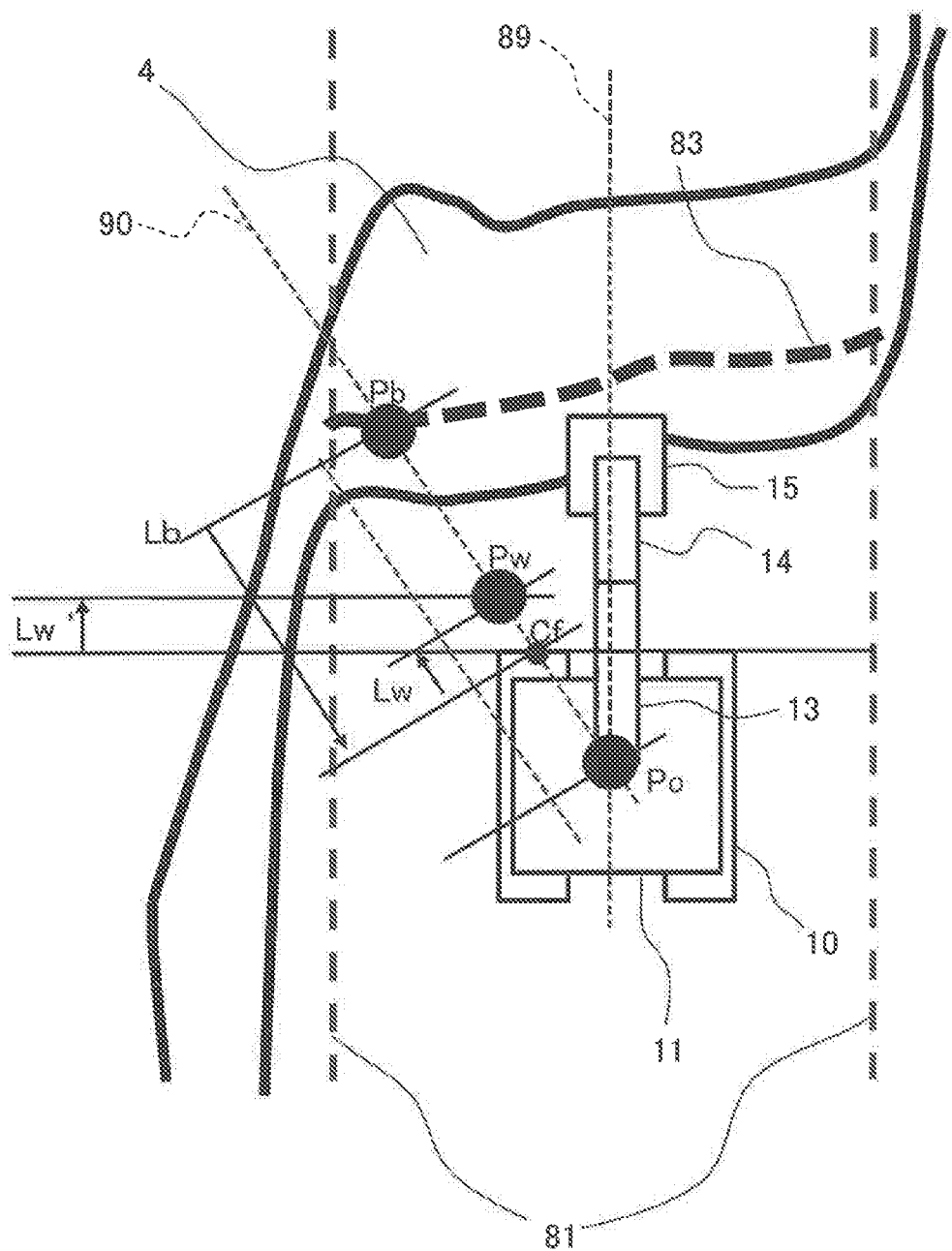
FIG. 20 is a top view showing a method of setting another object-to-be-excavated end Pb.

Furthermore, as shown in FIG. 20, the object-to-be-excavated end Pb may be set using another position on the object-to-be-excavated end datum line 83. FIG. 20 is a top view showing a method of setting another object-to-be-excavated end Pb. In an example of this drawing, the terrain data acquisition section 31 sets a point at which a horizontal distance from the tip end Cf of the lower travel structure 10 (vertical distance in FIG. 20) becomes a minimum value on the object-to-be-excavated end datum line 83 as the object-to-be-excavated end Pb. The work assist system may be configured such that the side cross-sectional views described using FIGS. 6 and 10 each use a plane 90 passing through the swing center Po of the hydraulic excavator 1 and the object-to-be-excavated end Pb as shown in FIG. 20. Furthermore, the work assist system may be configured to display not the distance Lw but a distance Lw' on the monitor 21 if the object-to-be-excavated end Pb is set in this way. The distance Lw' is a work position distance in a front direction of the hydraulic excavator 1 between the work position Pw and the tip end Cf of the lower travel structure 10.

Moreover, the work assist system is not limited to the configuration such that the object-to-be-excavated end Pb is specified as the position at which the horizontal distance becomes the minimum value on the object-to-be-excavated end datum line 83. For example, the work assist system may be configured such that a position at which an average value or a maximum value of the horizontal distance described above is specified as the object-to-be-excavated end Pb. Alternatively, the work assist system may be configured such that the above methods can be applied by being combined as appropriate by the setting input device 20. Furthermore, the work assist system may be configured such that a datum surface other than the datum surface 82 is set and that the second object-to-be-excavated end Pu is specified by using the other datum surface similarly to the object-to-be-excavated end Pb.

The number of work positions output by the work position calculation section 30 to the monitor 21 is not limited to one, and the work position distance Lw and the stable work position distance Lws, for example, may be displayed simultaneously.

The work position calculation section 30 is not limited to being implemented by the controller mounted in the hydraulic excavator 1. It may be configured such that an external computer performs necessary processes for calculating/displaying the stop position of the hydraulic excavator 1 and transmits the process result to the hydraulic excavator 1 via the wireless device 26. Furthermore, the setting input device 20 is not limited to being mounted to an interior of the operation room 17. It may be configured by a portable information terminal that can be carried by a supervisor or the like on a work site and that transmits various information to the hydraulic excavator 1 via the wireless device 26.

Figure 21:
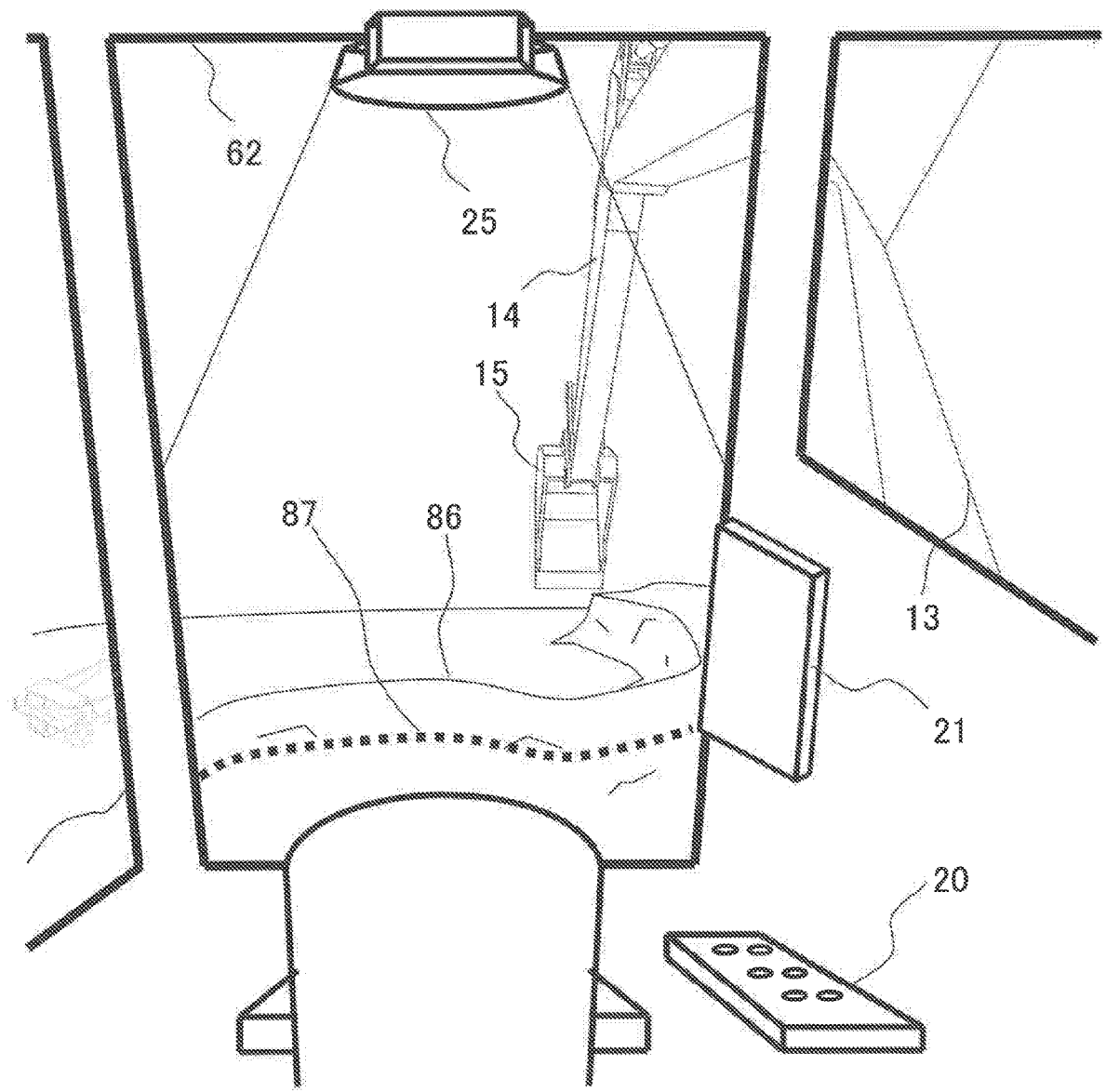
FIG. 21 is an overhead view showing a front of the hydraulic excavator from within an operation room when the work position is indicated using a head-up display.

Meanwhile, a guidance display device for stopping the excavator 1 at the work position Pw or Pws is not limited to the monitor 21 described above. FIG. 21 is an overhead view showing the front of the hydraulic excavator 1 from within the operation room 17. Another method of guiding the excavator 1 to the work position Pw or Pws will be described using FIG. 21.

In FIG. 21, a head-up display 25 in which a computer that performs a control process related to video display is embedded and which displays a virtual video in such a manner as to be superimposed on a real image on a windshield glass 62 on a front surface of the operation room 17 is mounted in an upper portion of the operation room 17. The terrain data acquisition section 31 outputs a shape of the edge 86 of the excavator ground contact surface 85 to the head-up display 25. The head-up display 25 displays a target end shape 87 obtained by offsetting the shape of the edge 86 output from the terrain data acquisition section 31 toward the excavator by the work position distance Lw (or Lws) on the windshield glass 62 on the front surface of the operation room 17. The operator moves the excavator 1 so that the target end shape 87 coincides with the edge 86 of the surface to be excavated 4 while viewing the real image on the front surface, and then stops the excavator 1. It is thereby possible to stop the excavator 1 at the work position Pw or Pws.

The guidance display device for guiding the excavator 1 to the work position Pw or Pws is not limited to the monitor 21 or the head-up display 25. It is possible to use the other display device such as a head-mounted display worn by the operator or a device that composites a video of an external camera with work position information and displays a composite video while the windshield glass is replaced by a monitor.

Meanwhile, a case in which the distance Lw or Lws from the tip end Cf of the lower travel structure 10 to the work position is displayed on the monitor 21 has been mainly described above. However, other information including an example of the target end shape 87 shown in FIG. 21 may be displayed if the information is related to the work position. Furthermore, an output result of the work position is not limited to use for "display" but may be used for "operation assist." For example, the work assist system may be configured to cut off the output from the travel lever when the hydraulic excavator 1 reaches the work position or may be configured such that the hydraulic excavator 1 automatically moves to the work position by adding a specific input.

The present invention is not limited to the above embodiments but encompasses various modifications without departing from the spirit of the invention. For example, the hydraulic excavator 1 has the upper swing structure 11, the boom 13, the arm 14, and the bucket 15. However, the configuration of the work device is not limited to this configuration, and the present embodiments are applicable to a hydraulic excavator equipped with a work device that can excavate the object to be excavated located below the ground contact surface. Moreover, the present invention is not limited to the work assist system that includes all the configurations described in the above embodiments but encompasses those from which a part of the configurations is deleted. Furthermore, a part of the configurations according to some embodiment can be added to or can replace configurations according to the other embodiment.

A part of or all of the configurations related to the controller 18 and functions, execution processes, and the like of the configurations may be realized by hardware (by designing logic for executing the functions, for example, by an integrated circuit, or the like). Moreover, a plurality of computers identical or different in an installation location may perform decentralized processing. Furthermore, the configurations related to the controller 18 may be implemented as a program (software) for realizing the functions related to the configurations of the controller 18 by causing an arithmetic processor (for example, a CPU) to read out and execute the program. Information related to the program can be stored in, for example, a semiconductor memory (such as a flash memory or an SSD), a magnetic storage device (such as a hard disk drive), or a recording medium (such as a magnetic disk or an optical disk).

DESCRIPTION OF REFERENCE CHARACTERS

1: Hydraulic excavator
10: Lower travel structure
12: Front work device
16: Operation room
18: Controller (control system)
19: Operation lever (operation device)
21: Monitor (display device)
24: Laser distance meter (shape sensor)
30: Work position calculation section
31: Terrain data acquisition section
32: Region-to-be-excavated determination section
34: Work position computing section
35: Travelling determination section
36: Display update section
82: Datum surface
83: Object-to-be-excavated end datum line
85: Bench upper surface (upper surface)
H: Height from datum surface 82
as: Stabilizing angle
S: Region to be excavated
Pb: Object-to-be-excavated end (datum point)
Pw, Pws: Work position
Lw, Lws: Work position distance

The invention claimed is:
1. A hydraulic excavator comprising:
a lower travel structure;
an upper swing structure swingably provided on the lower travel structure;
a work device provided in front of the upper swing structure and having a boom, an arm and a bucket; and
a controller configured to:
acquire a datum point that is set at an intersection of a plane that passes through both a swing center of the upper swing structure and a center of the work device and a boundary portion between a bench upper surface that is a flat surface on which the hydraulic excavator is placed at a time of excavation work and a surface to be excavated that is a downward inclined surface connected to the bench upper surface, and acquire a height of the bench upper surface from a predetermined reference plane, on the basis of input terrain data of an object to be excavated;

determine, on the basis of an assumed excavation amount set with reference to a capacity of the bucket of the work device and the height of the bench upper surface, a region to be excavated in which the assumed excavation amount is obtained from the object to be excavated by one excavation operation of the hydraulic excavator;

calculate a first work position that is a stop position of the hydraulic excavator for a next excavation operation on the basis of the region to be excavated;

calculate a distance from the datum point to the first work position;

calculate a work position distance that is a horizontal distance from a tip end of the lower travel structure to the first work position; and a display device that displays the work position distance calculated by the controller, wherein the controller is further configured to calculate:
a second work position of the hydraulic excavator on the bench upper surface based on a stabilizing angle of the object to be excavated, the stabilizing angle being a maximum tilt angle of the surface to be excavated at which the object to be excavated is stable without sliding.

2. The hydraulic excavator according to claim 1, further comprising a shape sensor that detects the terrain data of the object to be excavated, wherein the controller is configured to:
generate a surface shape image of the object to be excavated on the basis of the terrain data detected by the shape sensor, and
display the region to be excavated on the surface shape image on the display device.

3. The hydraulic excavator according to claim 2, wherein the controller is configured to calculate anew a work position of the hydraulic excavator upon determining at least one of:
an operation of the hydraulic excavator,
an input from an operation device, and
a change of the terrain data, and
display information related to the work position calculated anew on the display device.

4. The hydraulic excavator according to claim 3,
wherein
the work position distance is the longer of a distance from the datum point to the first work position and a distance from the datum point to the second work position.

* * * * *